United States Patent [19]

Hildebrand et al.

[11] Patent Number: 5,729,474
[45] Date of Patent: Mar. 17, 1998

[54] METHOD OF ANTICIPATING POTENTIAL HVAC FAILURE

[75] Inventors: Paul N. Hildebrand; W. John Light, both of Tulsa; T. Frank Knight, Owasso; Kelley A. Lawrence, Tulsa, all of Okla.

[73] Assignee: Excel Energy Technologies, Ltd., Tulsa, Okla.

[21] Appl. No.: 353,536

[22] Filed: Dec. 9, 1994

[51] Int. Cl.$^6$ .............. G01K 7/00; G05D 16/70
[52] U.S. Cl. .............. 364/557; 364/551.01; 364/557; 73/112; 236/10; 165/12
[58] Field of Search .............. 364/550–551.02, 364/557; 165/12, 24, 27, 26, 29; 374/16; 73/112; 236/10, 11, 464; 62/129

[56] References Cited

U.S. PATENT DOCUMENTS

| | | | |
|---|---|---|---|
| 4,518,032 | 5/1985 | Funasaki et al. | 165/12 |
| 4,682,473 | 7/1987 | Rogers, III | 62/86 |
| 4,898,230 | 2/1990 | Tsuchiyama et al. | 165/12 |
| 5,073,862 | 12/1991 | Carlson | 364/551.01 |
| 5,276,630 | 1/1994 | Baldwin et al. | 364/505 |
| 5,415,346 | 5/1995 | Bishop | 236/78 D |

*Primary Examiner*—Emanuel T. Voeltz
*Assistant Examiner*—Kamini S. Shah
*Attorney, Agent, or Firm*—Dougherty, Hessin, Beavers & Gilbert

[57] ABSTRACT

To anticipate potential failure of a temperature modification device (e.g., heating, ventilating and air conditioning equipment used in a commercial building), an efficiency value representing the ability of the temperature modification device to change temperature in a predetermined zone is repeatedly computed. When one of these values is computed, it is used in determining whether the ability of the temperature modification device to change temperature in the predetermined zone has deteriorated over time. This is done by comparing a current efficiency value with a previous efficiency value. In response to a determined deterioration exceeding a predetermined tolerance, a control signal for initiating inspection of the temperature modification device is communicated, thereby enabling the device to be serviced in response to a detected operating condition of the device and before actual failure of the device.

7 Claims, 20 Drawing Sheets

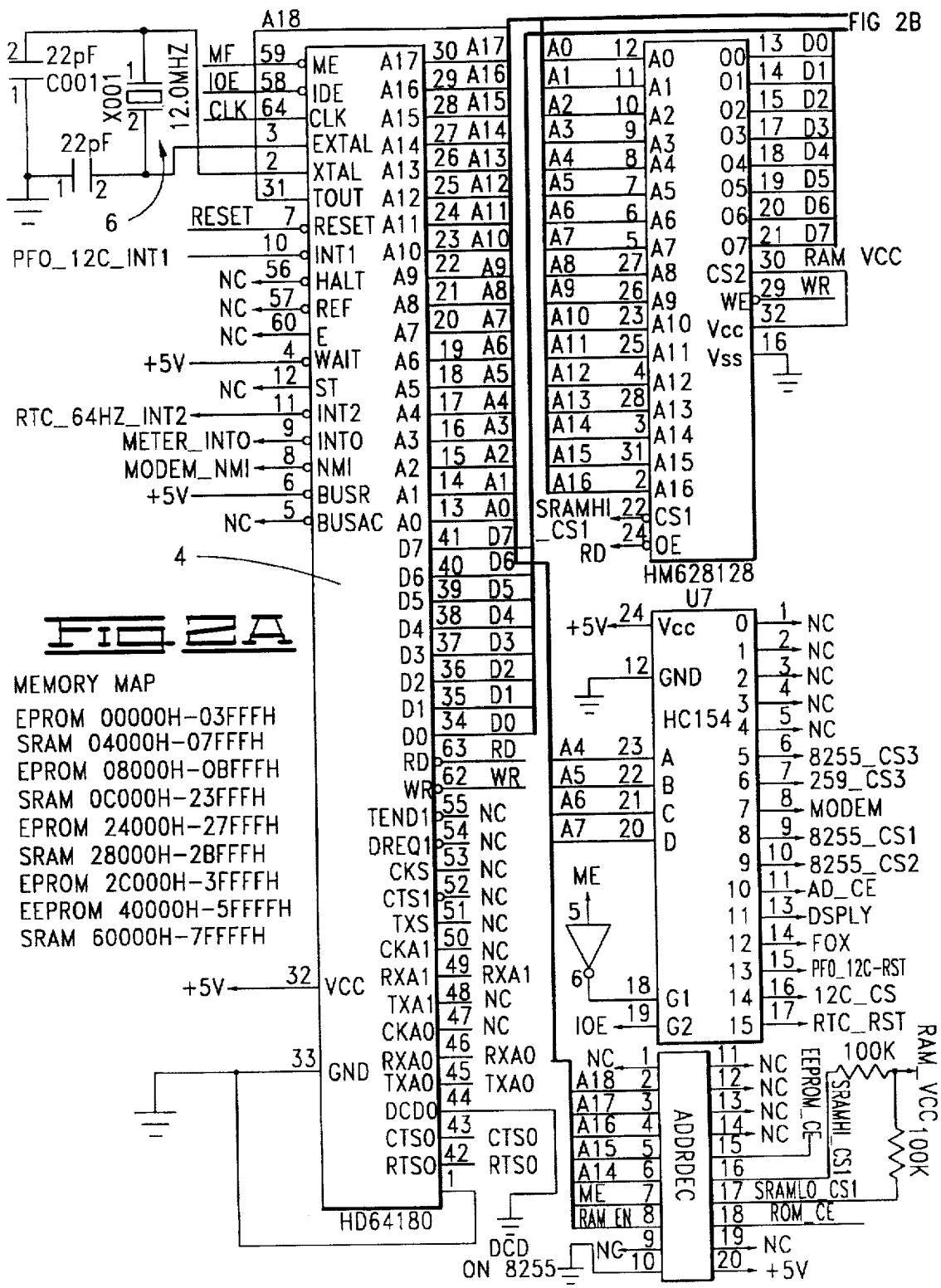

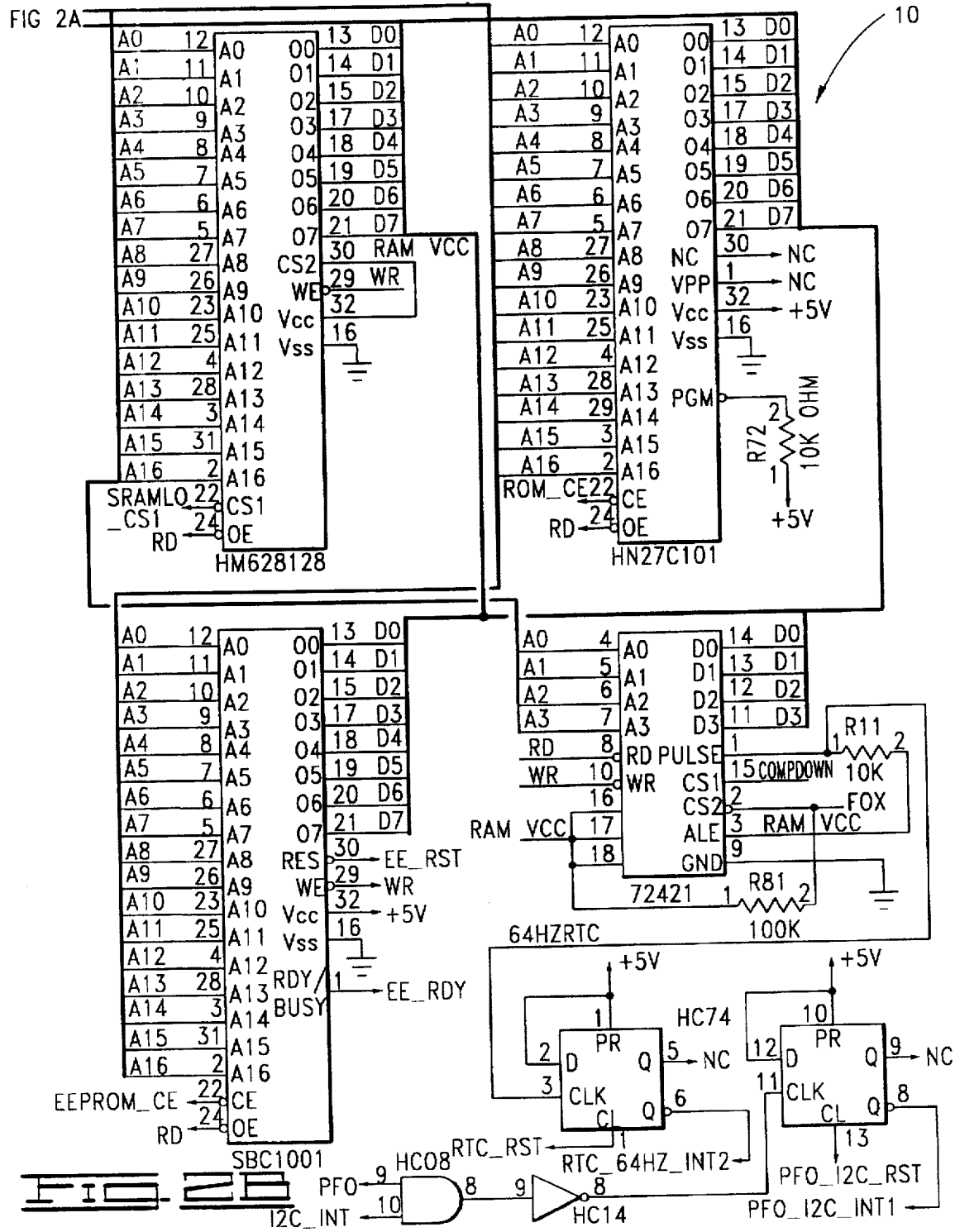

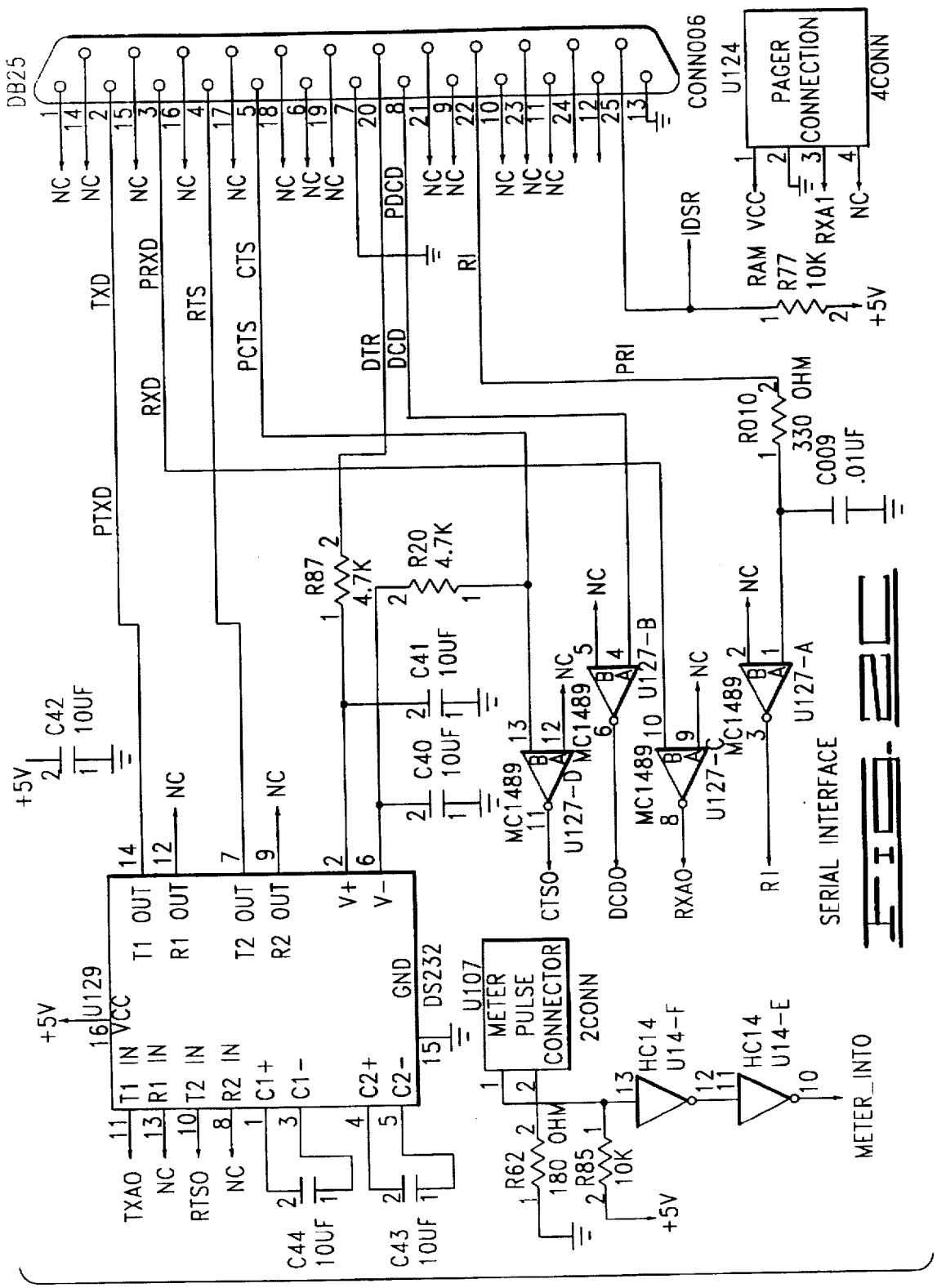

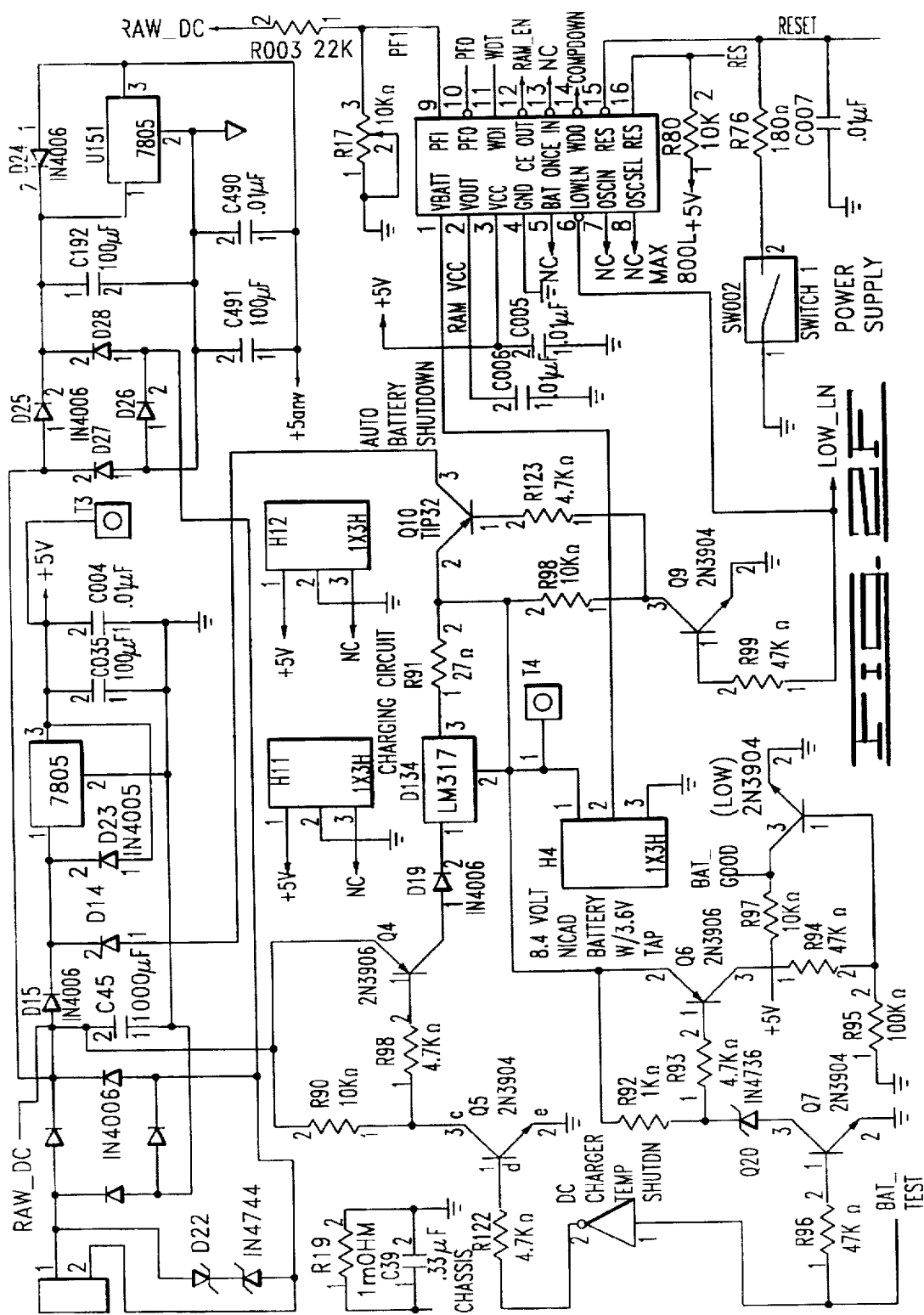

A/D CONVERTER AND AMPLIFIER

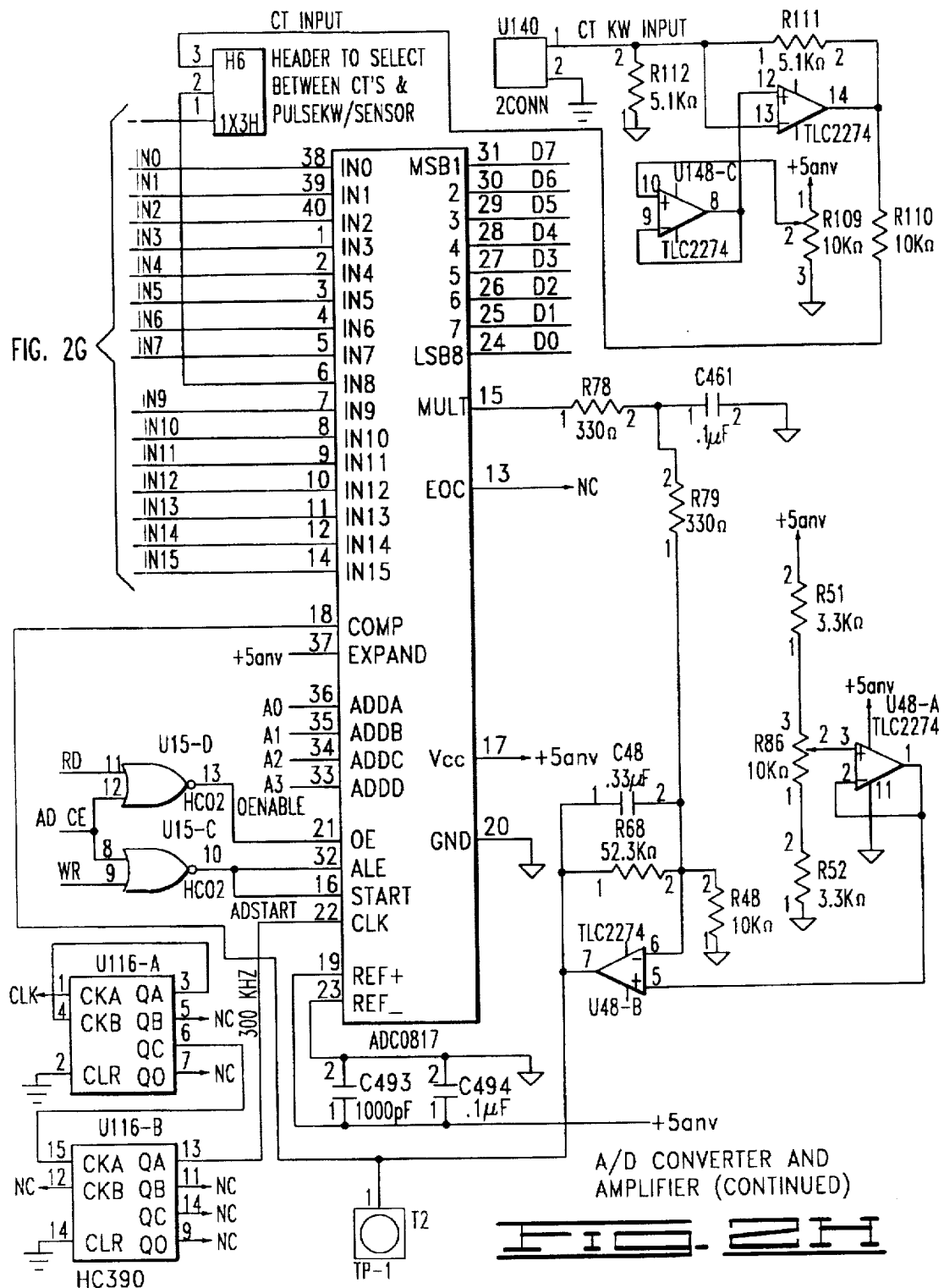

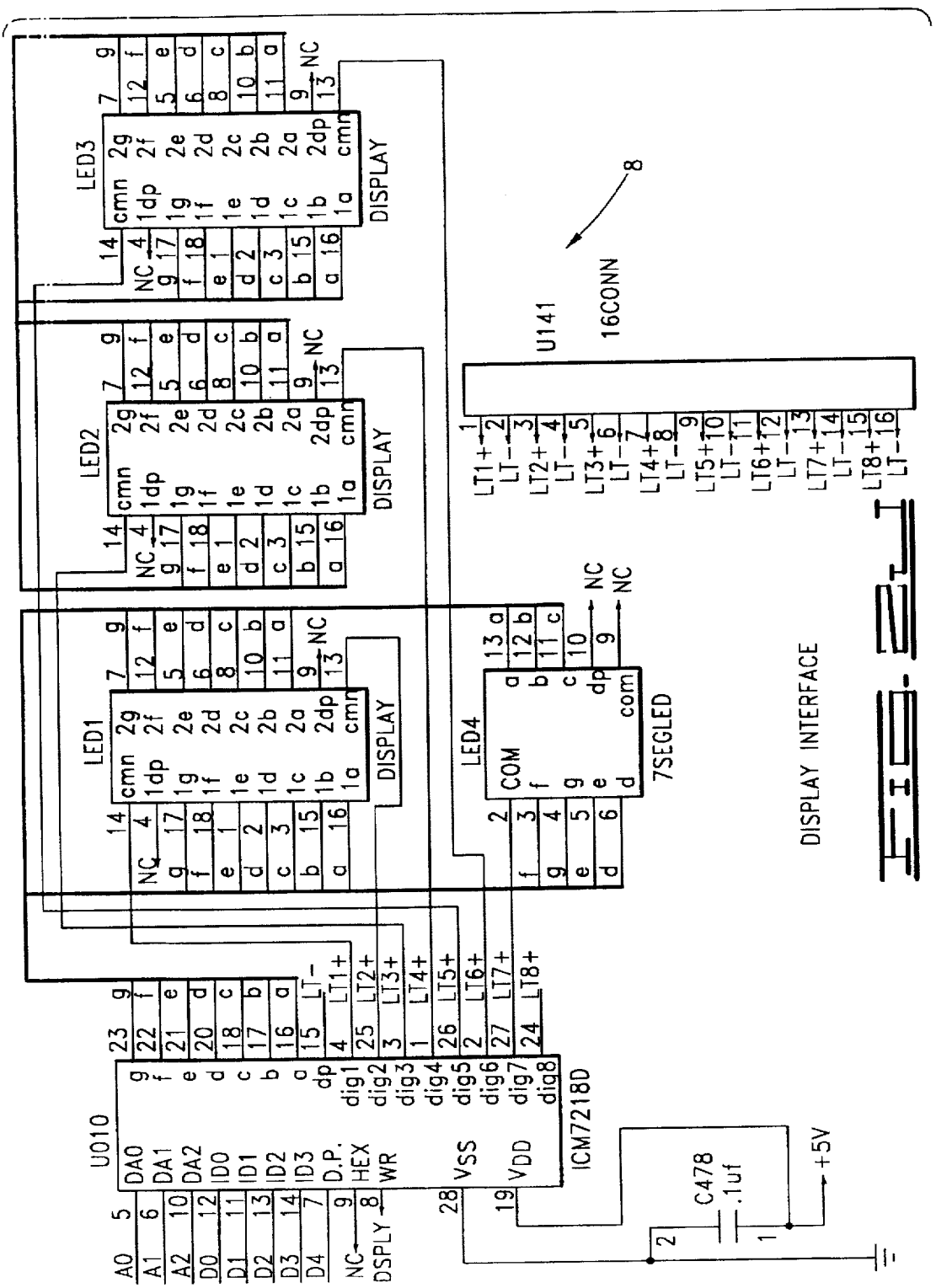
FIG. 21 DISPLAY INTERFACE

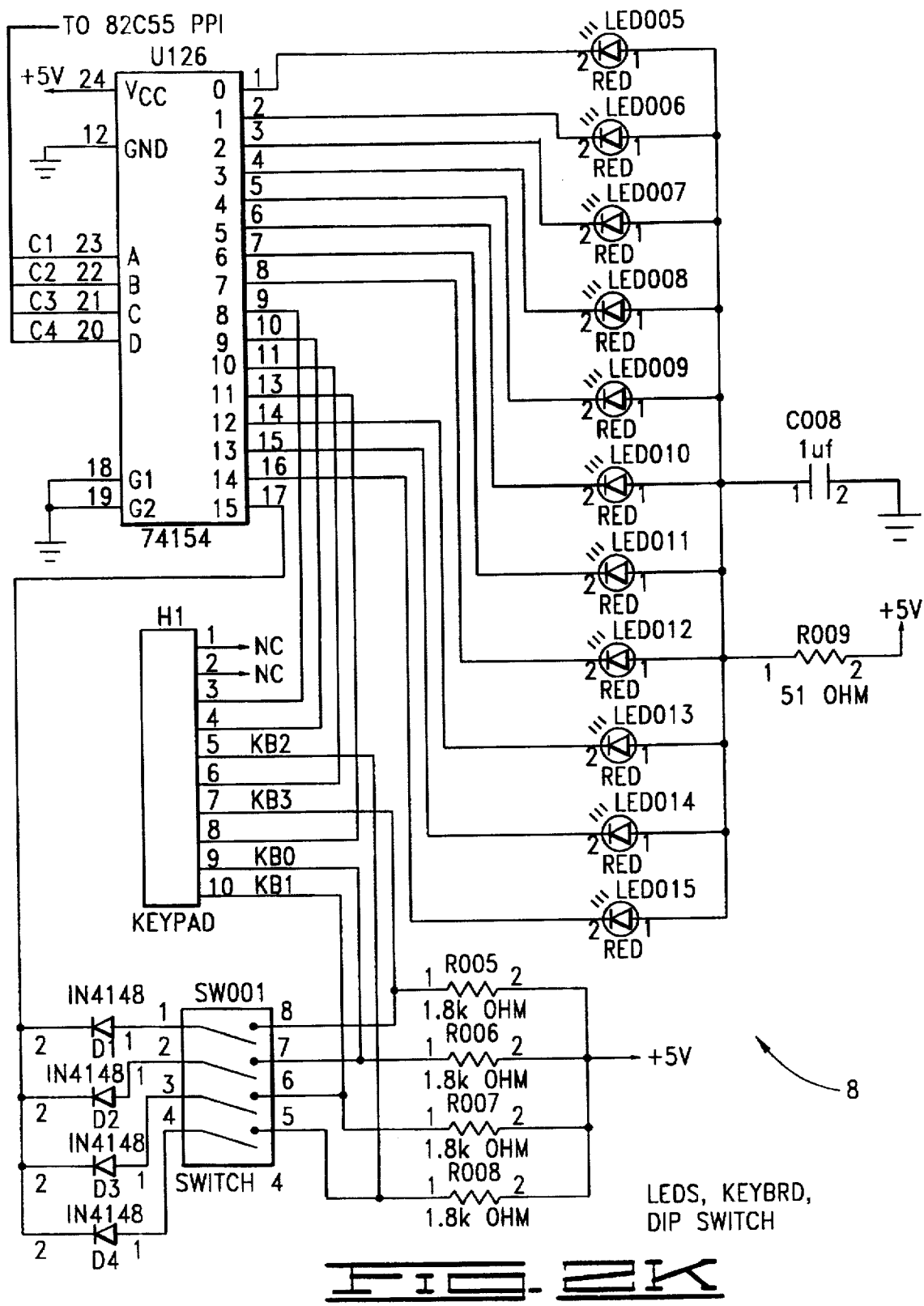

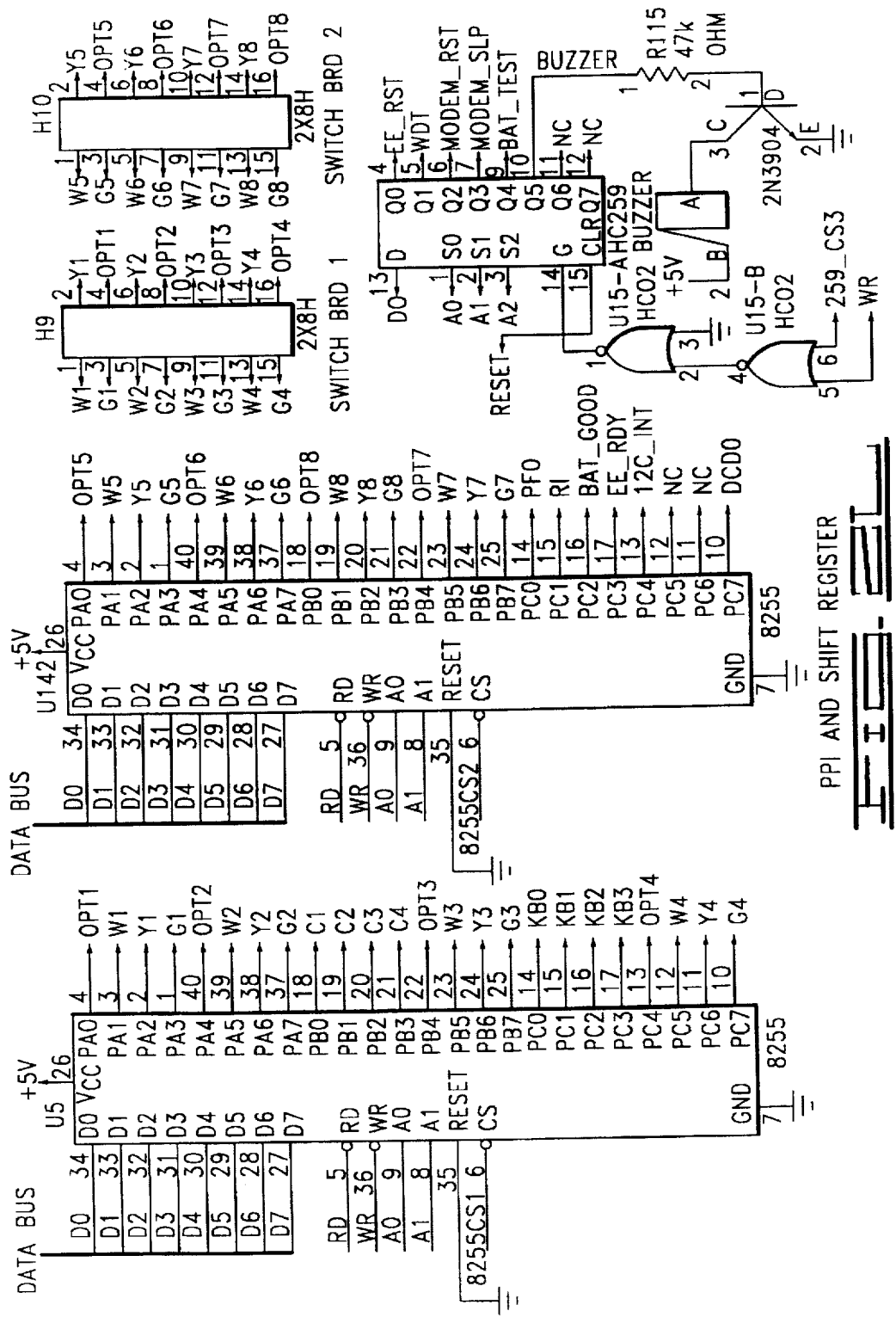

POWER CONNECTIONS

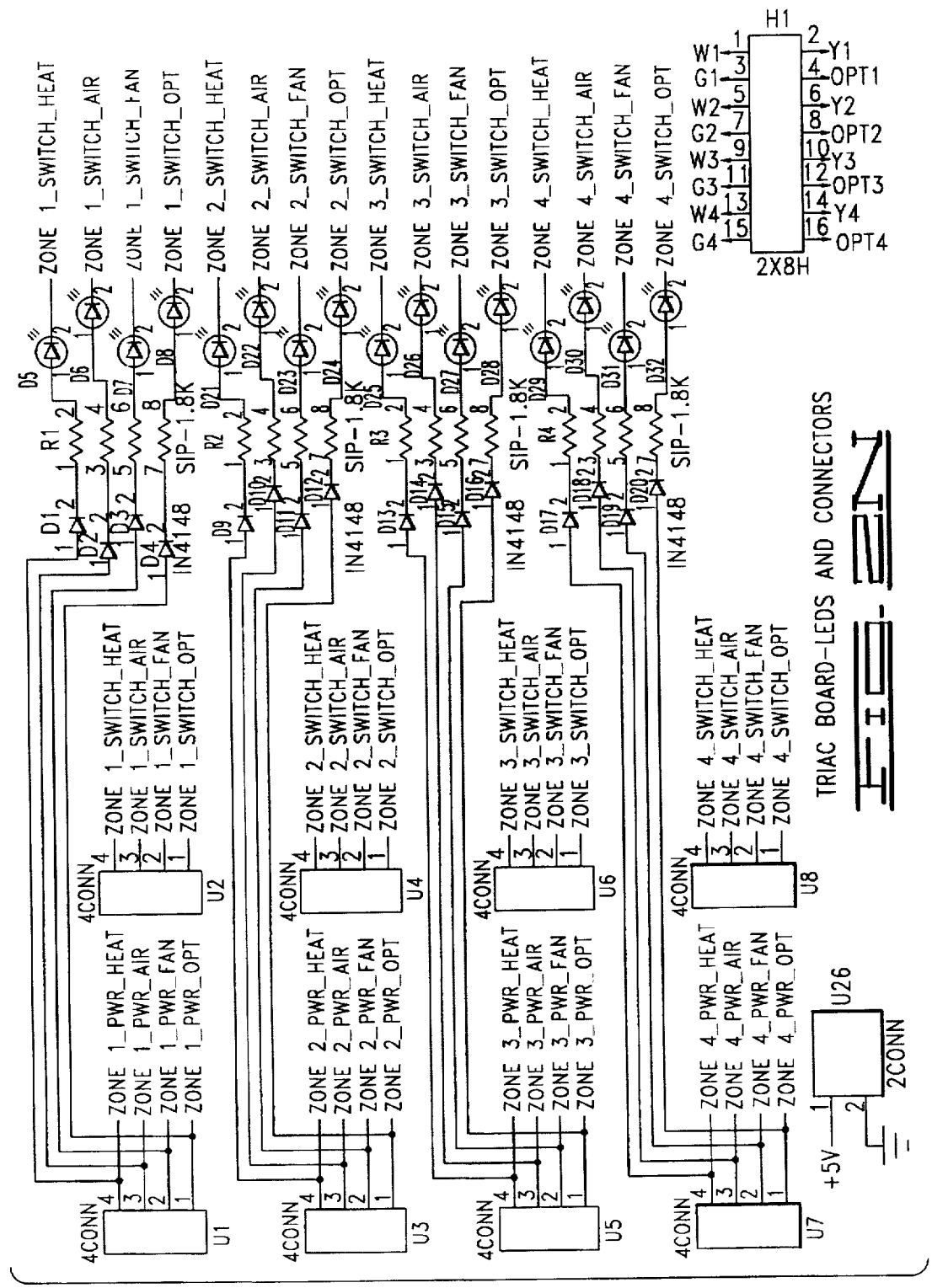

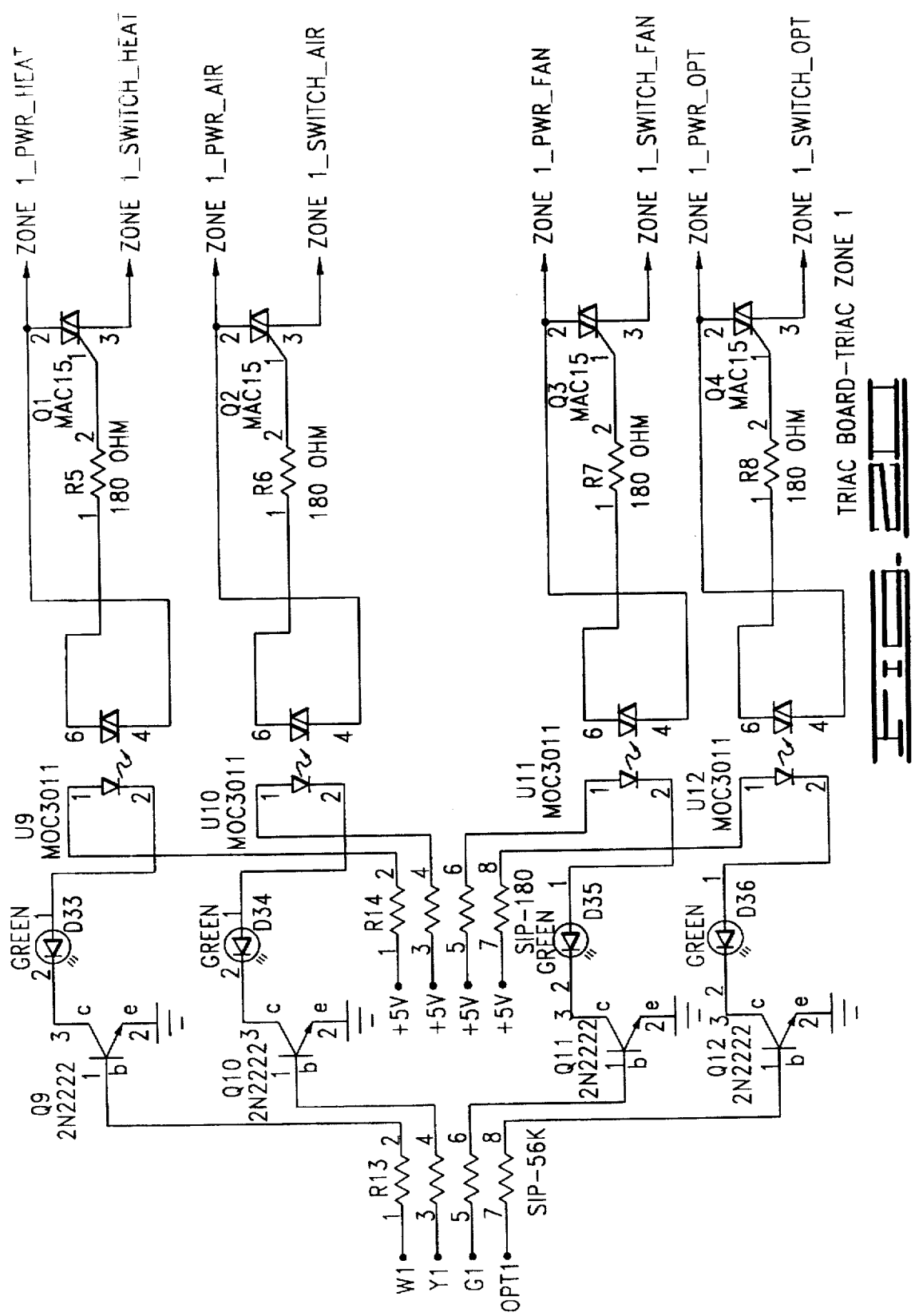

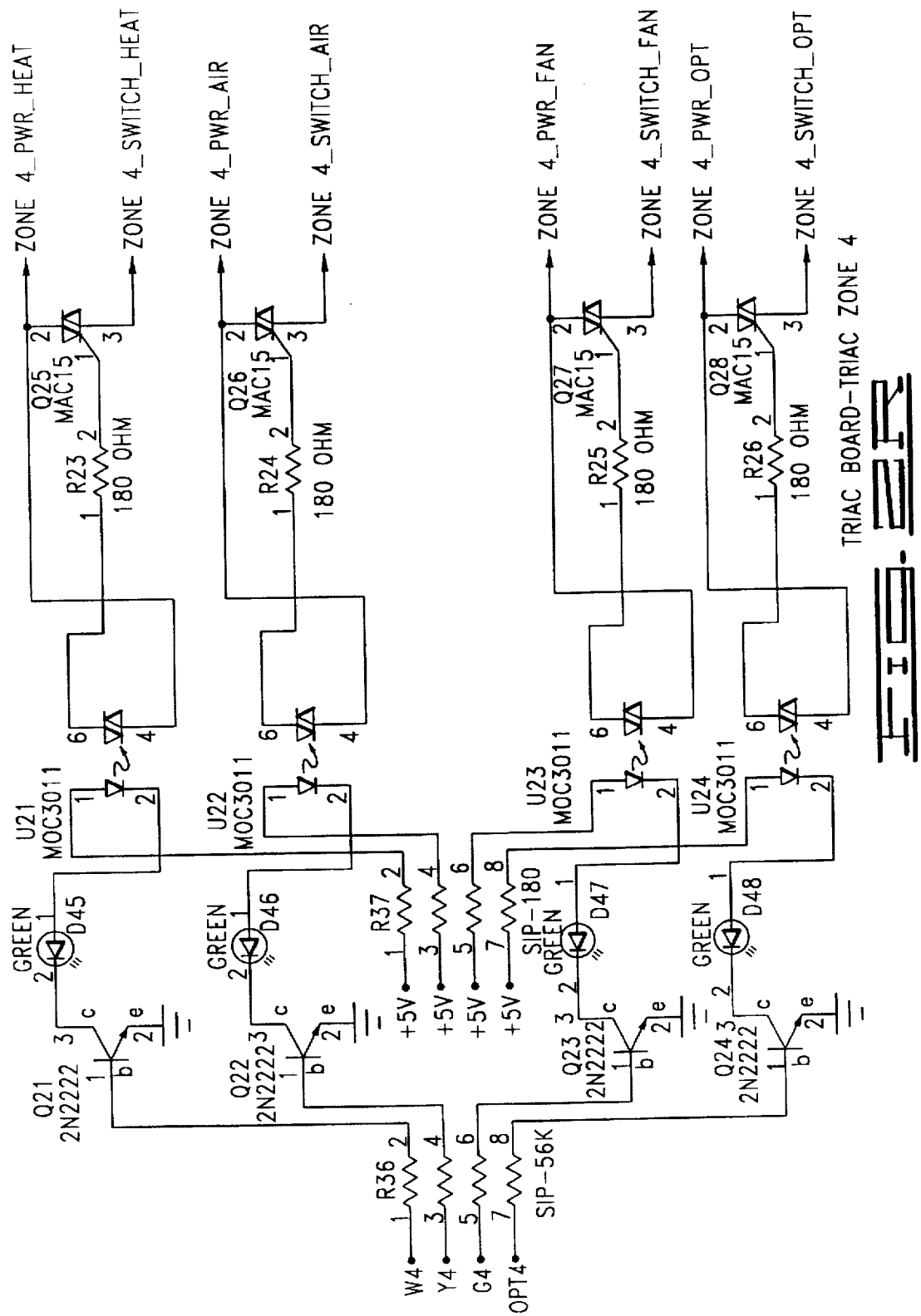

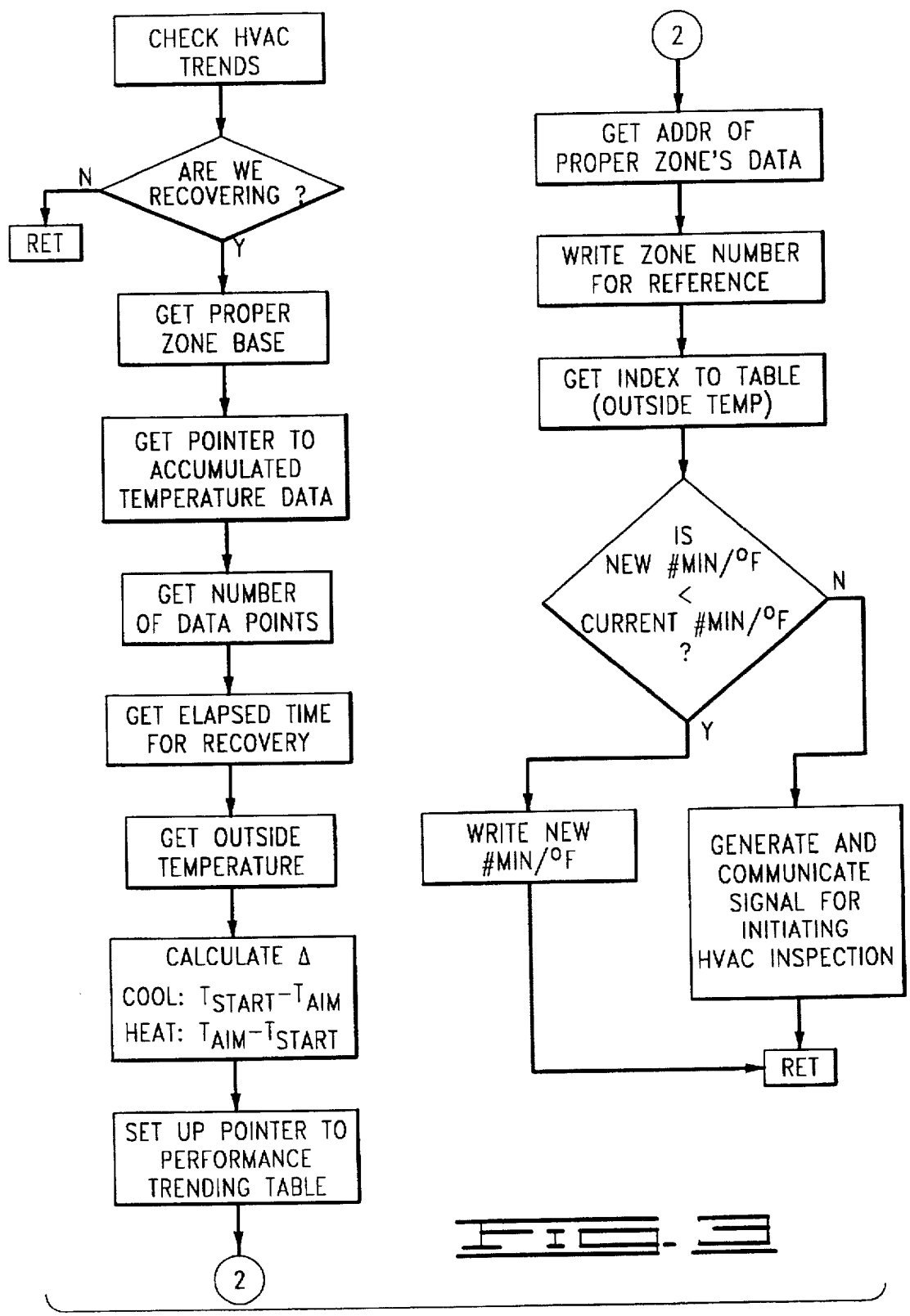

METHOD OF ANTICIPATING POTENTIAL HVAC FAILURE

BACKGROUND OF THE INVENTION

This invention relates generally to heating, ventilating and air conditioning (HVAC) equipment and methods pertaining to its use. More particularly, the invention relates to a method of anticipating potential failure of a temperature modification device, such as embodied in an HVAC system.

An HVAC system can be controlled by various types of energy management apparatus. For example, in one conventional residential system, an electromechanical thermostat controls a heater gas valve or an air conditioner compressor (depending on the selected mode) and a fan. In a more elaborate system such as may be used in a commercial building, a microprocessor-based controller operates the HVAC equipment.

Regardless of the particular system, HVAC equipment is typically operated until a failure occurs, then it is repaired. This can be costly not only because of the repair needed for the HVAC system, but also because of possible consequential costs which may result from the HVAC failure (e.g., damage to other equipment, such as computers, due to loss of cooling; overtime for repair services if failure occurs other than during normal business hours).

Preferably preventive maintenance is performed on the equipment; however, such maintenance is typically based on a selected time period (e.g., monthly, semi-annually, annually) or on the operational time of the equipment. Such maintenance is not, to our knowledge, based on an operating characteristic of the equipment itself (other than mere time of use). Thus, conventional preventive maintenance may not detect or solve an incipient problem, and it will not prevent a failure that arises wholly between maintenance episodes.

In view of the foregoing, there is the need for a method by which the operational ability of an HVAC system can be monitored and potential or incipient failures detected and corrected before actual or more substantial failure occurs.

SUMMARY OF THE INVENTION

The present invention overcomes the above-noted and other shortcomings of the prior art by providing a novel and improved method of anticipating potential failure of a temperature modification device. The preferred embodiment of the present invention is designed to monitor the operation and the effectiveness (efficiency) of an HVAC system. From this, potential problems with HVAC equipment can be anticipated before they actually occur. Corrective maintenance initiating signals can then be generated before equipment is damaged.

Steps of the method can be performed at any desired frequency. For example, monitoring can occur each morning when the HVAC system is operated to bring the temperature for a controlled zone from its more energy conserving nighttime level to its more comfortable daytime level.

The preferred embodiment of the present invention employs the following parameters: 1) outside ambient temperature($T_{out}$), 2) inside starting temperature ($T_{start}$), 3) desired temperature setpoint ($T_{aim}$), 4) HVAC recovery time to change inside temperature from $T_{start}$ to $T_{aim}$, and 5) the best or most efficient performance of the HVAC system to date. The method uses these parameters to determine the heating or cooling rate based on the temperature differential between the starting temperature ($T_{start}$) and the desired temperature setpoint ($T_{aim}$) and the corresponding recovery time to go from the starting temperature to the setpoint temperature. The method then logs this heating or cooling rate relative to the outside ambient temperature. As the rate of cooling or heating increases, thereby indicating a deterioration in the efficiency of the cooling/heating ability of the HVAC system, one or more signals for initiating corrective action are generated. Data can be collected and plotted over a period of time and made available for display or hard copy printout. Historical readings can be made on a periodic basis.

In accordance with the foregoing, the present invention can be defined as a method of anticipating potential failure within an HVAC system operated by a digital computer to heat or cool a zone. This method comprises energizing the HVAC system to provide a selected one of heated air or cooled air to the zone. This energizing step includes: storing in the digital computer a value, $T_{aim}$, for a desired temperature setpoint; storing in the digital computer a value, $T_{start}$ of an actual temperature in the zone; determining a difference between the stored desired temperature setpoint value and the stored actual temperature value and determining whether the difference indicates the need for the selected one of heated air or cooled air; and generating a control signal for energizing the HVAC system in response to the difference indicating the need for the selected one of heated air or cooled air so that heated air or cooled air is provided to the zone for changing the temperature in the zone from $T_{start}$ to $T_{aim}$.

The method also comprises the step of determining whether the efficiency of the HVAC system changes over time; this includes performing the following steps contemporaneously at least once during each of a plurality of predetermined periods of time during which the step of energizing is repeatedly performed. These steps include: determining the amount of time, $\Delta t$, it takes for the energized HVAC system to change the actual temperature in the zone from the respective $T_{start}$ to the respective $T_{aim}$; computing an efficiency value, $\Delta t/|T_{start}-T_{aim}|$, for the HVAC system; sensing an ambient temperature outside the zone and storing a value, $T_{out}$, thereof in the digital computer; and comparing a present computed efficiency value with a prior computed efficiency value which was computed contemporaneously with sensing ambient temperature outside the zone at the same value of $T_{out}$ and which was stored in the digital computer in relation to a marker identifying such same value of $T_{out}$. The present computed efficiency value exceeding the compared prior computed efficiency value represents a decrease in efficiency of the HVAC system, whereas the prior computed efficiency value exceeding the compared present computed efficiency value represents an increase in efficiency of the HVAC system.

This method of the present invention further comprises the step of storing the present computed efficiency value in the digital computer in place of the prior computed efficiency value for the same value of $T_{out}$ in response to the step of comparing indicating an increase in efficiency. This method still further comprises generating and transmitting from the digital computer a control signal for initiating inspection of the HVAC system in response to the step of comparing indicating a decrease in efficiency exceeding a predetermined tolerance.

The invention can be more broadly defined as a method of anticipating potential failure of a temperature modification device, comprising steps of: repeatedly computing a value for a parameter representing the ability of a temperature modification device to change temperature in a predetermined zone; determining if the ability of the temperature modification device to change temperature in the predetermined zone deteriorates over time, including comparing a current value with a previous value; and communicating a control signal for initiating inspection of the temperature modification device in response to a determined deterioration exceeding a predetermined tolerance.

Accordingly, a significant advantage of the present invention is that it can be used to anticipate potential HVAC failures, thereby preventing or reducing the likelihood of inopportune down time and more serious damage to equipment.

Therefore, from the foregoing, it is a general object of the present invention to provide a novel and improved method of anticipating potential failure of a temperature modification device. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 3 is a flow diagram of a program for programing the illustrated system to perform the method of the present invention.

DETAILED DESCRIPTION OF PREFERRED EMBODIMENTS

The following copending United States patent applications are incorporated herein by reference: U.S. patent application Ser. No. 08/349,180 filed Dec. 2, 1994 and entitled "ENERGY UTILIZATION CONTROLLER AND CONTROL SYSTEM AND METHOD," and U.S. patent application Ser. No. 08/353,535 filed concurrently herewith and entitled "TEMPERATURE CONTROL METHOD AND APPARATUS."

Figure 1:
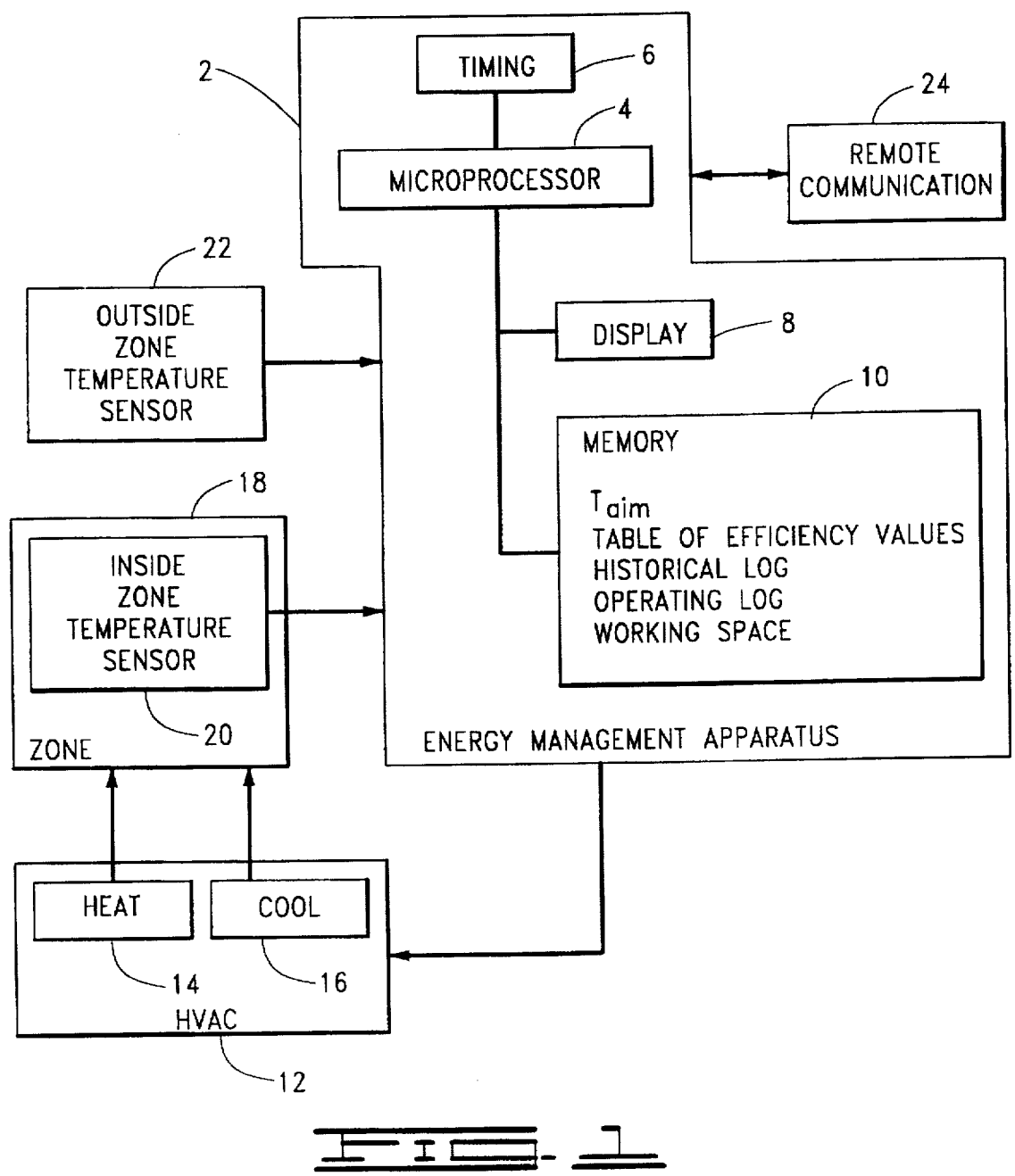
FIG. 1 is a block diagram of a system for performing the method of the present invention.

Referring to FIG. 1 of the present specification, the preferred embodiment implementation of the present invention uses an energy management apparatus 2. The preferred embodiment of this includes a microprocessor 4. The microprocessor 4 operates under a timing signal provided by a timing circuit 6 which includes a crystal oscillator. The microprocessor 4 has address, data and control buses connected to peripherals which include a display 8 and memory 10. The memory 10 can be embodied in various and multiple forms (e.g., read only memory can be used to retain operating programs and predetermined values and random access memory can provide transitory working memory space). The foregoing elements can be implemented by any suitable devices well-known in the art.

Although the physical components comprising the preferred embodiment energy management apparatus 2 are conventional, the method of the present invention implemented using this equipment is not. This method will be explained subsequently. At present, it is noted that the preferred embodiment uses information stored in memory 10. This includes a desired temperature value, $T_{aim}$, for each zone whose temperature is to be controlled by the energy management apparatus 2. This information also includes a table of efficiency values which are calculated and stored during performance of the method as subsequently described. A historical log can be created and maintained in memory 10 by the present invention.

Also represented in FIG. 1 is a temperature modification device particularly identified as a heating, ventilating and air conditioning (HVAC) system 12. The HVAC system 12 includes a heating subsystem 14 (including, for example, a gas heater) and a cooling subsystem 16 (including, for example, an air conditioner compressor) which typically share a common fan of the HVAC system 12. The fluid (e.g., air or water) heated or cooled within the HVAC system 12 is provided to one or more respective zones, one of which is represented in FIG. 1 as zone 18.

To monitor the effect of the treated medium used for heating or cooling the air in the zone 18, there is a zone temperature sensor 20 located inside the zone 18. This is a conventional sensor, such as a National Semiconductor LM234Z-3, in the preferred embodiment.

Another characteristic or parameter important to the preferred embodiment of the present invention is temperature outside the zone 18. This is monitored by a conventional temperature sensor 22 (e.g., National Semiconductor LM234Z-3) located outside the zone 18 to measure the ambient temperature adjacent the zone 18.

Still further, FIG. 1 shows that remote communications can be conducted with the energy management apparatus 2. A remote communication system 24 can be implemented in any suitable manner, such as by a modem link to which a personal computer is connected at the remote end. Bidirectional communications can occur so that information can be transferred either to or from the energy management apparatus 2. Other communication systems can also be used (e.g., a paging data receiver system as disclosed in the aforementioned copending United States patent application entitled "Energy Utilization Controller and Control System and Method" incorporated herein by reference).

Figure 2D:
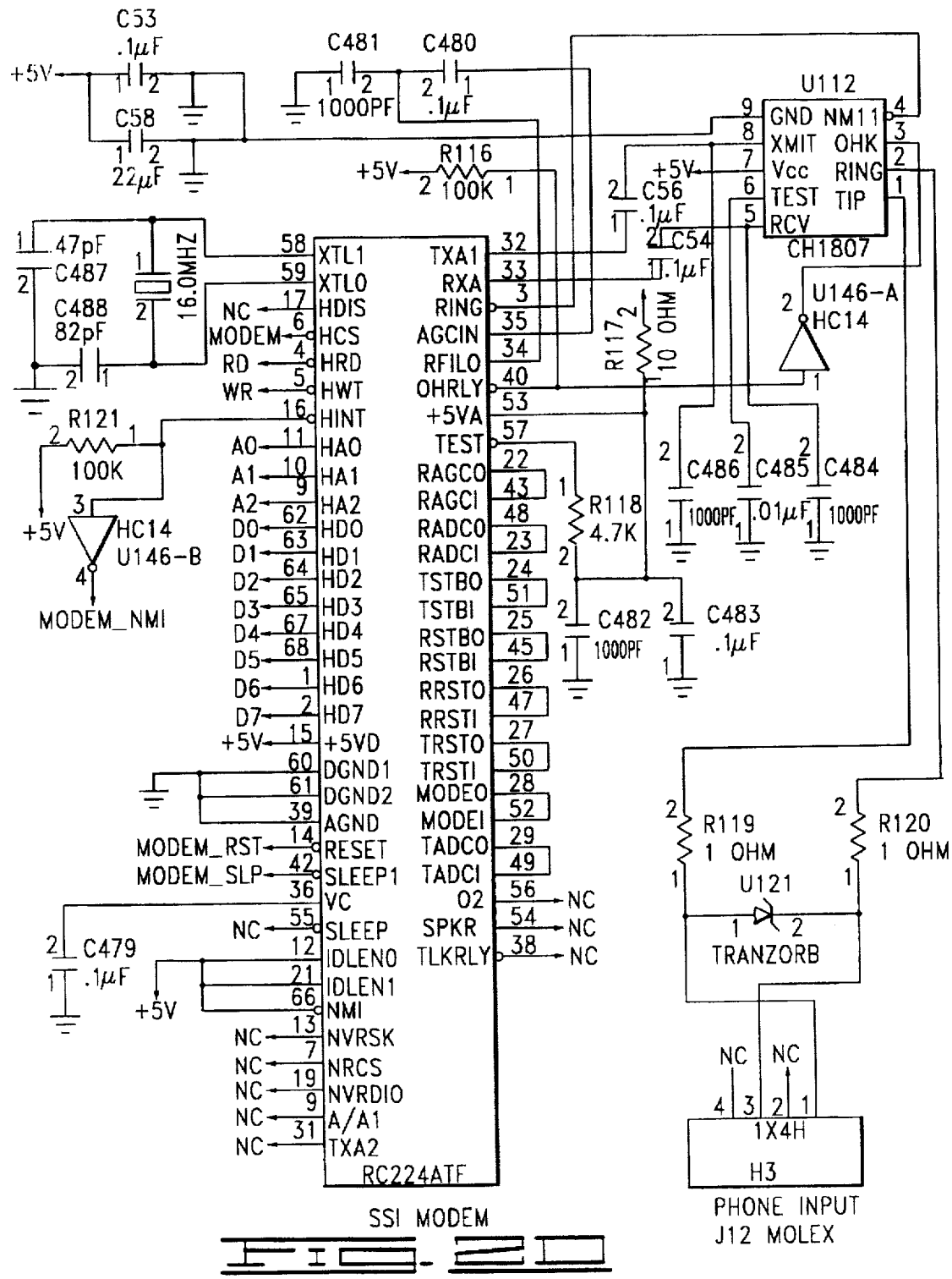
FIGS. 2A–2R are schematic circuit diagrams for a specific implementation of the system represented in FIG. 1.
Figure 2E:
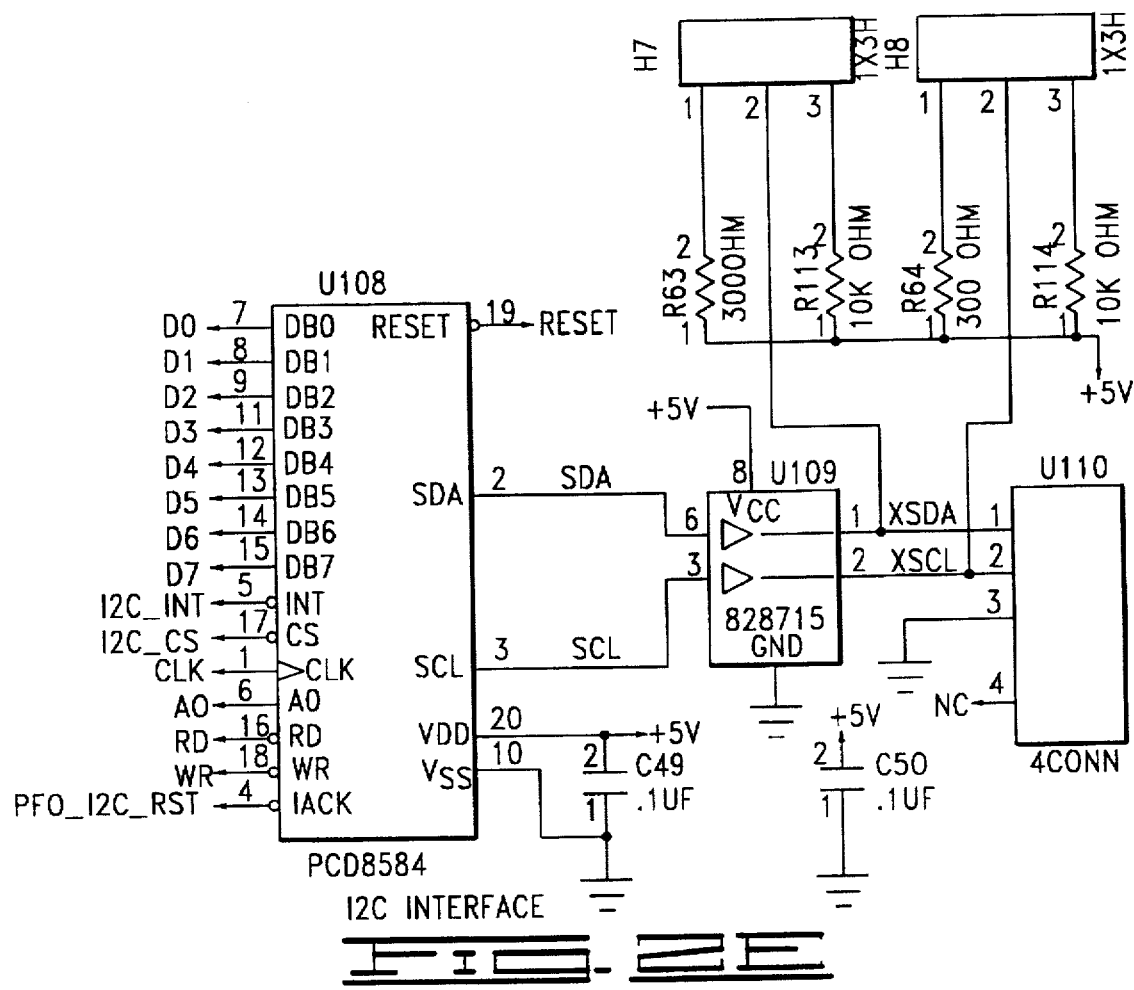
Figures 2G, 2H:
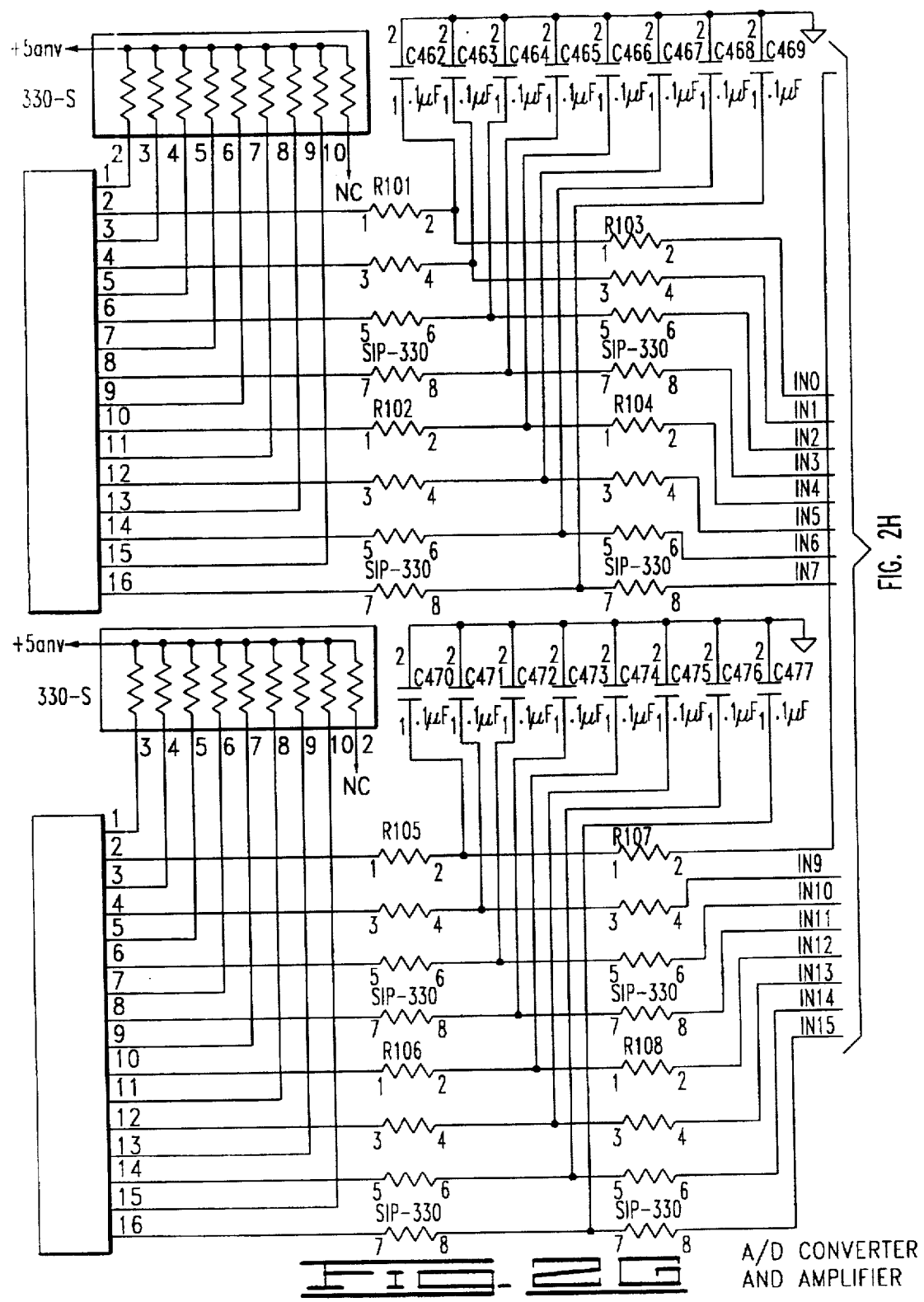
Figure 21:
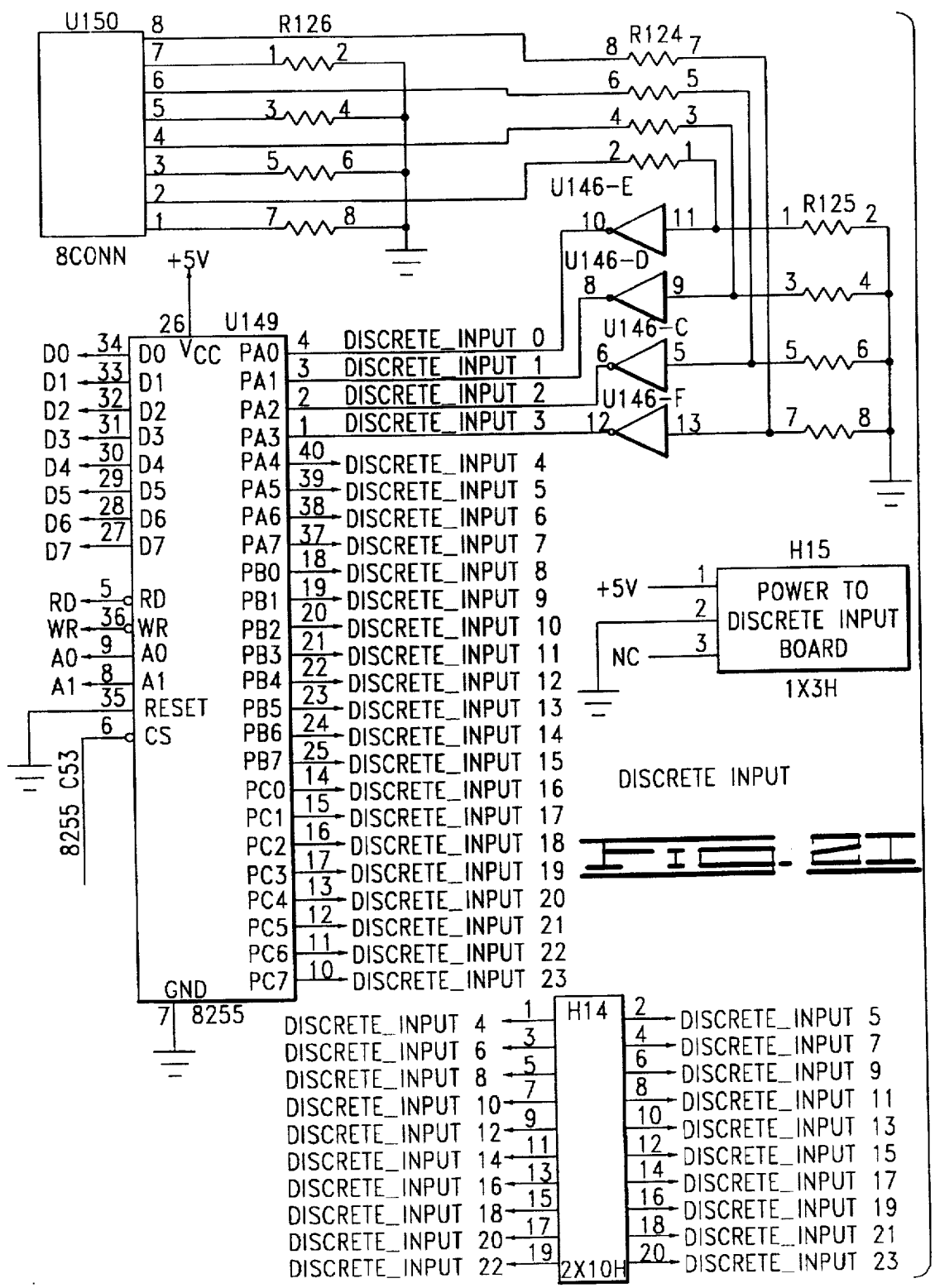
Figure 2M:
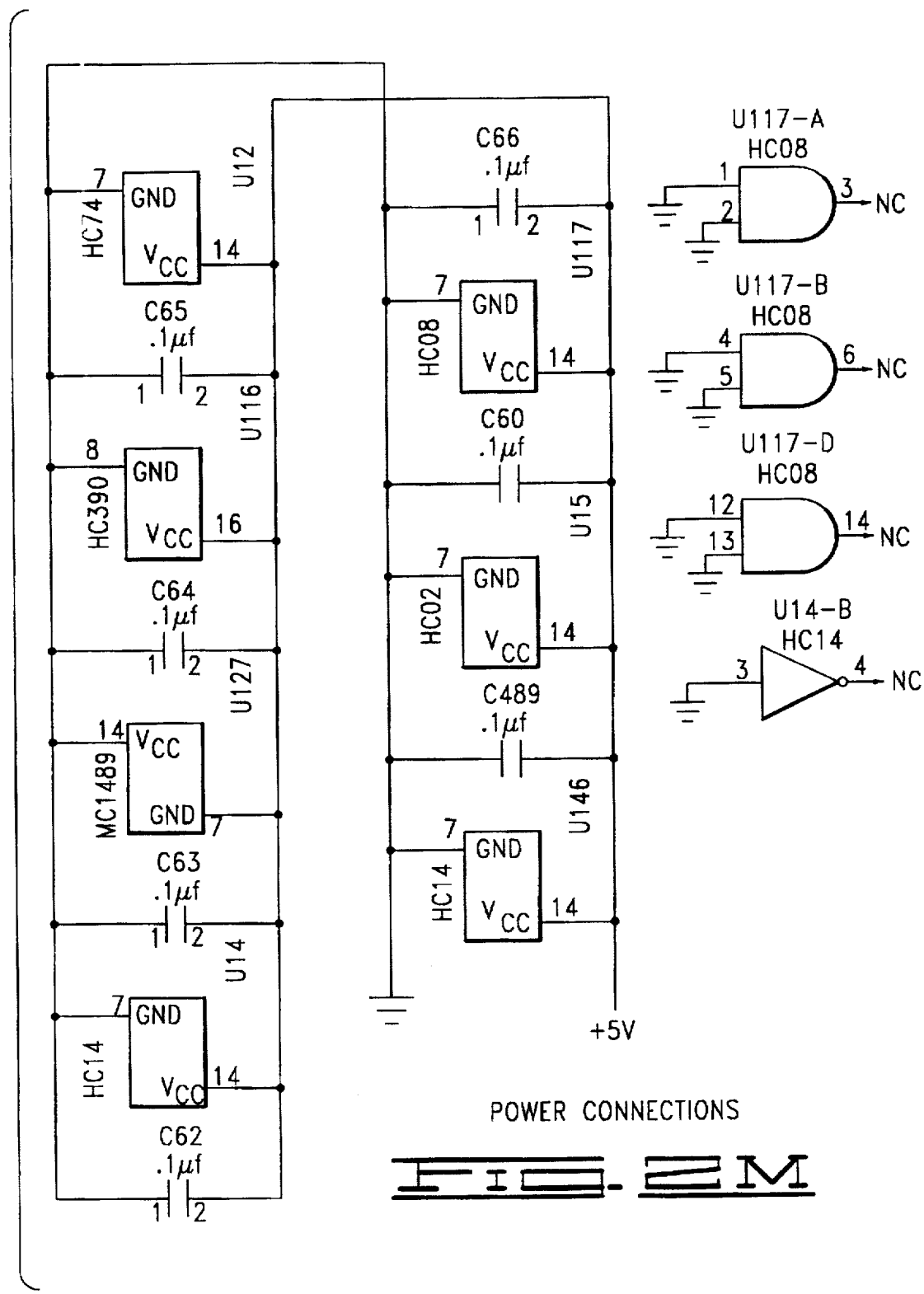
Figure 17:
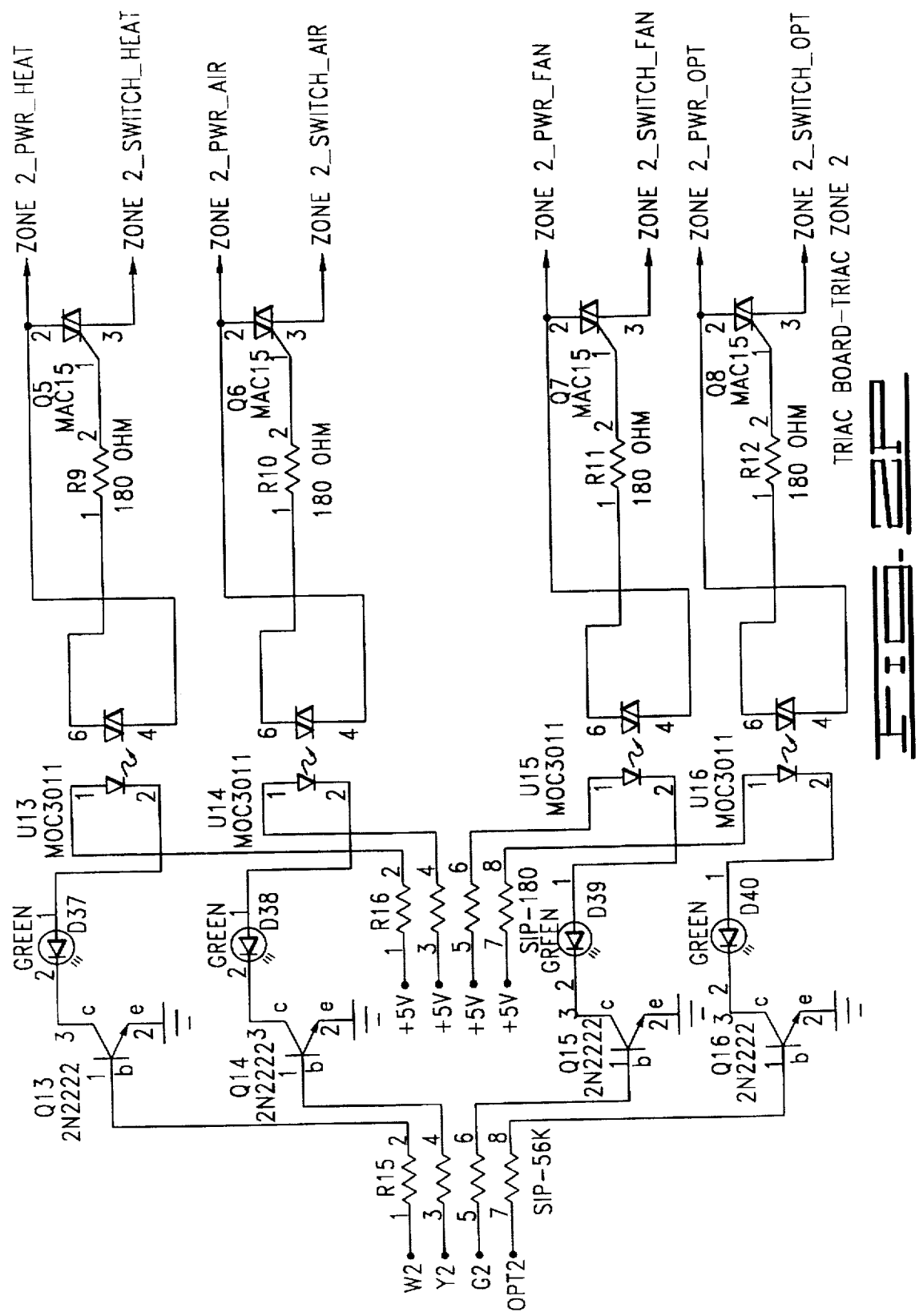
Figure 20:
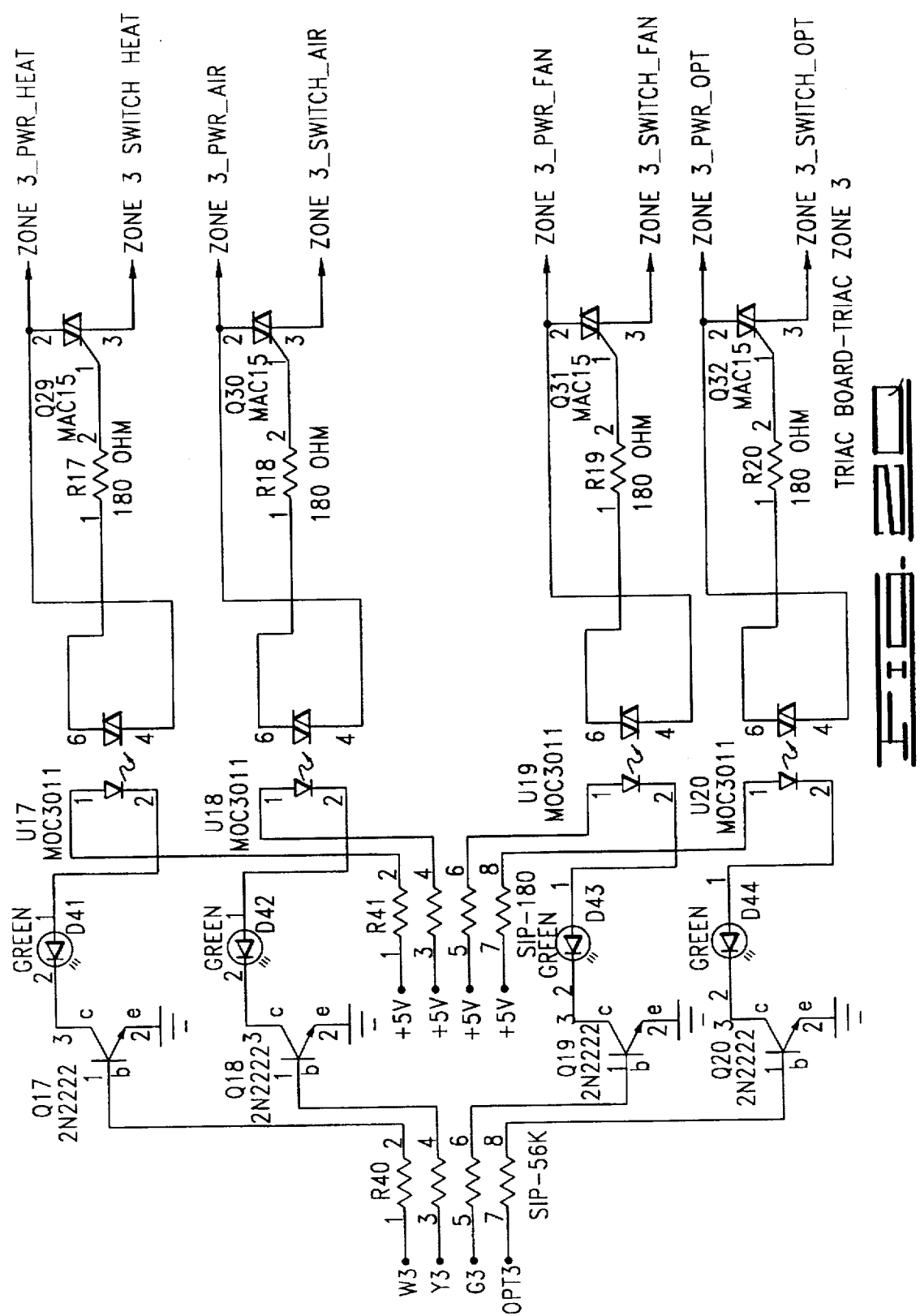

The physical implementation of the foregoing can be by any suitable means known in the art. For example, the energy management apparatus 2 can be an Excel Energy Technologies, Ltd. XLT-8000 energy management apparatus and the temperature sensors can be implemented by the aforementioned specific devices. A schematic circuit diagram of relevant features of these embodiments is shown in FIGS. 2A–2R. Elements in FIGS. 2A–2R corresponding to those shown in FIG. 1 are identified by like reference numerals. FIGS. 2A–2M show the main processing circuits and FIGS. 2N–2R show the HVAC interface circuits.

As for the HVAC system 12 it can be implemented for example by an existing system in a building where the energy management apparatus 2 and the temperature sensors are, or are to be, installed. The building, if it is a commercial building, is typically defined, for purposes of heating and cooling, as one or more of the zones 18 (e.g., peripheral zones having windows and interior zones such as hallways).

The foregoing examples are only illustrative and are not to be taken as limiting the present invention.

The equipment described above with reference to FIGS. 1 and 2 is used to perform the method of the present invention. This method is used for anticipating potential failure of a temperature modification device (such as the equipment of the HVAC system 12), preferably operated by a digital computer (such as implemented in the energy management apparatus 2) to heat or cool a zone (such as the zone 18 and additional zones if desired). This method comprises various steps explained as follows.

During the performance of the method, the HVAC system 12 is energized in conventional manner to provide a selected one of heated air or cooled air for the respective zone 18. This includes storing in the digital computer, which is defined in part by the microprocessor 4, the timing circuit 6 and memory 10, a value for a desired temperature setpoint. The setpoint temperature is referred to herein as $T_{aim}$. Such a setpoint is defined for each zone 18 wherein temperature control is to be effected. This or these setpoints can be preloaded into memory 10 or changed therein via operator control through locally or remotely initiated commands applied to the energy management apparatus 2 in known manner (e.g., through keypad entry or remote link for an XLT-8000 apparatus).

Energizing the HVAC system 12 in the preferred embodiment also includes storing in the digital computer a value of an actual temperature in the zone. This is performed by monitoring and processing the output of the temperature sensor 20, which can be performed in a conventional manner, within the energy management apparatus 2 and storing the value in memory 10.

Energizing the HVAC system 12 further includes determining a difference between the stored desired temperature setpoint value and the stored actual temperature value. It also includes determining whether the difference indicates the need for the selected one of heated air or cooled air. This occurs, of course, if the actual zone temperature is below $T_{aim}$ during a selected heating mode or if the actual zone temperature is above $T_{aim}$ during a selected cooling mode. This is performed using known computational and comparison techniques within the digital computer.

Energizing the HVAC system 12 still further includes generating a control signal for energizing the HVAC system in response to the computed difference indicating the need for the selected one of heated air or cooled air. This signal is generated in the illustrated embodiment by the microprocessor 4 and output to the HVAC system 12 (in the particular implementation of FIG. 2, the signal interconnection is made via interfaces U5 and U142 and the 2 by 8 header connectors H9 and H10 in FIG. 2L and H1 in FIG. 2N to operate the triac circuits of FIGS. 2O–2R connected to the HVAC system 12). This is performed in known manner.

The foregoing steps are typically performed several times during various time periods. For example, each day the energy management system 2 will activate the HVAC system 12 as a monitored zone temperature drifts from the respective desired setpoint $T_{aim}$. During each such period of time the present invention determines whether the efficiency of the HVAC equipment changes over time. It is through this efficiency determination that incipient problems with the HVAC system 12 can be detected and corrected whereby total failure and possible consequential damage can be avoided.

The efficiency determination is made in the preferred embodiment of the present invention by performing the following steps contemporaneously at least once during each of a plurality of periods of time during which the above-described step of energizing is repeatedly performed (e.g., predetermined time periods such as daily, weekly, monthly, etc.). A preferred time is in the morning in conjunction with bringing a controlled zone's temperature back to a desired daytime level from a lower or higher nighttime level (which levels are set by changing the operative $T_{aim}$).

In making the efficiency determination, at least one ambient condition is sensed. Each such ambient condition is preferably one that affects the rate at which the temperature modification device of the HVAC system 12 can change the controlled temperature. In the preferred embodiment, one such condition is the ambient temperature sensed by the temperature sensor 22 outside the zone 18 (e.g., the air temperature outside the building in which the zone 18 is defined). The digital value derived in conventional manner by the energy management apparatus 2 from the sensor 22 is stored in memory 10 in the digital computer. This value is referred to herein as $T_{out}$. This is significant to an efficiency evaluation because ambient temperature, such as outside a building containing the zone 18, affects the rate at which temperature changes within the zone 18 during activation of the HVAC system 12 (e.g., the hotter it is outside, the longer it takes to cool inside per degree of inside temperature change).

The efficiency determination also uses the sensed temperature for the zone 18. This can be obtained from the aforementioned sensing of this condition, or a separate reading of the sensor 20 can be used. The particular sensed value used is referred to herein as $T_{start}$.

Each efficiency determination is made with regard to the particular $T_{out}$ obtained at the time of making the determination. This is so that comparisons can be made as to determinations made at different times but under the same external condition(s) (only the $T_{out}$ condition is used in the preferred embodiment, but it is contemplated that other or additional conditions can be used for defining the external environment within which the efficiency determination is made). For the particular condition or conditions, the efficiency determination further includes determining an actual rate at which the temperature modification device changes the sensed temperature in the zone 18 from a first temperature value to a second temperature value. More specifically, the amount of time, $\Delta t$, it takes for the energized HVAC system 12 to change the actual temperature in the zone 18 from the respective $T_{start}$ to the respective $T_{aim}$ is determined. This is obtained by the microprocessor 4 keeping track of the time, as counted in response to the timing circuit 6, from when the microprocessor 4 starts to effect temperature change from $T_{start}$ until $T_{aim}$ is achieved. Then an efficiency value is computed under control of the programmed microprocessor 4. The efficiency value is computed by dividing $\Delta t$ by the difference between the two temperatures: $\Delta t / |T_{start} - T_{aim}|$.

In the cooling mode this can be calculated as $K_{c(Tout)} = CR_c / (T_{start} - T_{aim})$, where:

$K_{c(Tout)}$=computed cooling rate used as the efficiency value for the sensed outside ambient temperature $T_{out}$ (minutes/° F.)

$T_{start}$=starting zone temperature from which temperature change commences (° F.)

$T_{aim}$=desired temperature setpoint to which temperature is to be changed (° F.)

$CR_c$=cooling recovery time in going from actual $T_{start}$ to actual sensed temperature equal to $T_{aim}$ (minutes).

In the heating mode this can be calculated as $K_{h(Tout)} = CR_h / (T_{aim} - T_{start})$, where:

$K_{h(Tout)}$=computed heating rate used as the efficiency value for the sensed outside ambient temperature $T_{out}$ (minutes/° F.)

$T_{start}$=starting zone temperature from which temperature change commences (° F.)

$T_{aim}$=desired temperature setpoint to which temperature is to be changed (° F.)

$CR_h$=heating recovery time in going from actual $T_{start}$ to actual sensed temperature equal to $T_{aim}$ (minutes).

After a first efficiency value has been calculated, it is stored in the table of efficiency values retained in memory 10. The value is stored in correspondence with the value of the sensed at least one ambient condition. That is, in the preferred embodiment the table is indexed by $T_{out}$ so that the calculated efficiency value is stored at the index corresponding to the actually sensed $T_{out}$.

The foregoing steps are repeated at the next time at which another efficiency evaluation is to be made (e.g., the next morning). Thus, this determines, for the then sensed at least one ambient condition, a current actual rate at which the temperature modification device changes the sensed temperature. If the sensed ambient condition (i.e., $T_{out}$ in the preferred embodiment) is different from previous determinations, the efficiency value is stored in the table for that ambient condition. If, however, the ambient condition is the same as the ambient condition for a prior efficiency calculation, then a comparison is made to determine whether the efficiency of the HVAC system 12 has changed over time (more, less or unchanged efficiency can be indicated).

The present computed efficiency value is compared with a prior computed efficiency value which was computed contemporaneously with sensing ambient temperature (in the preferred embodiment) outside the zone at the same value of $T_{out}$ and which was stored in the digital computer in relation to a marker identifying such same value of $T_{out}$. If the present computed efficiency value exceeds the prior computed efficiency value (i.e., the present value indicates it is taking longer to effect a 1° F. temperature change), this represents a decrease in efficiency of the HVAC equipment. If, on the other hand, the prior computed efficiency value exceeds the present computed efficiency value (thus representing a faster temperature change rate at the present calculation time), this represents an increase in efficiency of the HVAC equipment. Equal compared values represent unchanged efficiency.

If more efficient operation of the temperature modification device is indicated by the comparison, the present computed efficiency value is stored in the digital computer in place of the prior computed efficiency value for the same value of $T_{out}$. In this way, there is maintained in the computer a table of the actual rates representing the most efficient operation of the temperature modification device over a period of time. As previously mentioned, these actual rates are stored in the table in conjunction with respective indexing markers representing outside temperatures existing when the actual rates were determined.

In the preferred embodiment, such table has three variable data arrays representing: a first column of the outside ambient temperature ($T_{out}$) indexing markers, a second column of cooling rates determined for respective ones of the $T_{out}$ markers, and a third column of heating rates determined for respective ones of the $T_{out}$ markers. For example, the start up table could include only the outside ambient temperature ($T_{out}$) vector at a given range of 135° F. to −66° F. in 1° F. increments. The data arrays for heating and cooling rates would preferably be initially assigned zeros. As efficiency rates are calculated, they are assigned to the corresponding outside ambient temperature and stored in the table in the manner described above. If a table entry is replaced by a later calculated efficiency value, the old rate with date is stored in a historical log also maintained in memory 10. This provides the ability to log optimum performance for each outside ambient temperature variable and yet maintain an archive of prior values.

If less efficient operation (by more than a predetermined tolerance in the preferred embodiment) is indicated by the aforementioned comparison, a control signal is generated for initiating inspection of the temperature modification device. This signal is generated and transmitted from the digital computer in the energy management apparatus 2. Transmission can occur locally, such as to the display 8, or it can occur remotely, such as through the remote communication network 24. The signal can be of any suitable format and content. One example is an encoded signal causing a message (e.g., "recovery rate is exceeding the stored historical data for identical cooling and heating conditions") to be displayed. As a result, the HVAC system 12 can be taken offline at a convenient time, inspected and repaired, if desired.

As mentioned, the signal is generated under control by the programmed microprocessor 4 when the current efficiency value adversely deviates from the stored value by a predetermined tolerance. This tolerance can be any desired value (including zero). For example, the tolerance may be 5 percent; but whatever value is used, it is preferably changeable such as by local entry or upload through the remote communication network 24.

EXAMPLE

The following is an example illustrating how the present invention functions and notifies of a possible HVAC performance degradation.

On one morning, the computed recovery time is determined to be 60 minutes for a client's HVAC system. The conditions that generated this recovery time are: outside ambient temperature of 30° F. ($T_{out}$), inside starting temperature of 60° F. ($T_{start}$) and a desired temperature setpoint of 70° F. ($T_{aim}$). This calculates to a temperature change of 10° F. when $T_{aim}$ is reached. The resulting efficiency value calculates to an average heating rate of 6 minutes per ° F. (60 minutes/70° F.−60° F.). If a month later, at identical ambient conditions (here, $T_{out}$ equals 30° F. and with a 10° F. recovery temperature change), the morning's calculated recovery time is 120 minutes, then the rate of heating is 12 minutes per ° F. (120 minutes/10° F.). If the predetermined percent deviation or tolerance is 15 percent, then an inspection initiating control signal is generated and transmitted since the deviation is 100 percent in this example.

The foregoing method can be implemented in the system generally represented in FIG. 1. In FIG. 3 there is shown a flow diagram for a particular computer program for the specific implementation shown in FIG. 2. A program listing for such a program is set forth at the end of this specification.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

```c
void CheckHVACTrends (char mode, char zone, unsigned char *deviation)
{       // deviation will be passed a zero for the time being
extern int PERF_TREND[1]; /* starting address for trending table */
int *minperdegreePtr; /* landing address of table entry */
int ElapsedTime; /* holding var for above, nasty bank switching */
unsigned char NumDataPoints; /* holding variable */
char OutsideTemp; /* holding var for above, naty bank switching */
char info[5]; /* teeny array for phone homes edification */
unsigned char Delta; /* Tstart +- Taim depending on mode */
RGH_TEMPDATA    *rhg_ptr;
RGH_TEMPDATUM   *data_ptr;
RGH_START_REC   *start_data_ptr;
extern const    RGH_TEMPDATA * const rgh_zones_heat[RGH_NUM_ZONES];
extern const RGH_TEMPDATA * const rgh_zones_cool[RGH_NUM_ZONES];
    // Test recovery flag
    if(!BIT((zone), &RECOVERING))
        return;
    RESET((char *) &RECOVERING, (zone));
    zone -=1;
    /* minperdegreePtr, elapsedtimePtr, and outsidetempPtr are all
       addresses in bank 1. . .so get that processing done first */
    /* Get address of HEAT/COOLdataX for zone */
    if (!mode)
        rgh_ptr = rgh_zones_cool[zone];
    else
        rgh_ptr = rgh_zones_heat[zone];
    start_data_ptr = (RGH_START_REC *)*(rgh_ptr->data[rgh_ptr->next_index-1]);
    data_ptr       = (RGH_TEMPDATUM *)start_data_ptr;
    /* Fetch the number of collected data points */
    NumDataPoints = rgh_ptr->total_points;
    /* Fetch total elapsed time for recovery */
    ElapsedTime = data_ptr->run_time;
    /* Fetch outside temperature */
    OutsideTemp = data_ptr->run_time;
    /* Get temperature difference from start to end */
    if (!mode)    /* cool mode, Delta = Tstart - Taim */
        Delta = data_ptr->start - data_ptr->aim;
    else /* heat mode, Delta = Taim - Tstart */
        Delta = data_ptr->aim - data_ptr->start;
    /* Now write to the HVAC Trending Table */
    /* The rest of the memory that needs to be accessed is in bank 3 */
    /* BANK_SWITCH_3( ); This location was changed to bank 1 */
    /* set up local pointer to point to beginning of trending table */
    minperdegreePtr = PERF_TREND;
    /* get address of proper zones area */
    minperdegreePtr = minperdegreePtr + TRENDING_ZONE_DATA_SIZE * zone;
    /* write zone number to table */
    *minperdegreePtr = zone + 1;
    /* increment pointer */
    minperdegreePtr++;
    /* get address of proper outside temperature */
    minperdegreePtr += UPPER_TEMP_TABLE_LIMIT - OutsideTemp;
    /* if the new time is better, or we haven't been there yet, replace */
    if  ((ElapsedTime/Delta < *minperdegreePtr) || !(*minperdegreePtr))
    {
        *minperdegreePtr = ElpasedTime/Delta;
        /* No need to do this BANK_SWITCH_1( ); */
    }
    /* otherwise, phone home */
    else if (ElapsedTime/Delta > *minperdegreePtr * (1 + *deviation))
    {
        /* BANK_SWITCH_1( ); */
        info[0] = zone + 1;
        info[1] = *minperdegreePtr; // This int goes into infor[1] & infor [2]
        info[3] = ElapsedTime/Delta;
        issue (HVAC_TREND,info);
    }
}
void HVACTrendInit(void)
{
    // initialize performance trending table
    memset(PERF_TREND,0x00,TRENDING_DATA_SIZE * 2);
}
/*
 * Contains the structure for accessig the data values
 * used by reghelp.c for keeping heat/cool run values.
 *
 *
 */
#ifndef REGHELP_H
```

-continued

```
#define REGHELP_H
#define RGH_NUM_SAMPLES   (32)
#define RGH_NUM_ZONES     (8)
#define RGH_COOL_MODE     (0)
#define RGH_HEAT_MODE     (1)
#define RGH_NUM_DIMS      (4)
#define RGH_BUFF_SPACE    (0xe4)  /* Matches space allocated in 8zmemloc.s01 */
typedef struct rgh_start_rec
{
    char          outside;
    char          start;
    char          hour;
    char          min;
    unsigned int  est_mins;
} RGH_START_REC;
typedef struct rgh_tempdatum
{
    char          outside;
    char          start;
    char          aim;
    char          padding;
    unsigned int  run_time;
} RGH_TEMPDATUM;
typedef struct rgh_tempdata
{
    unsigned char   total_points;
    unsigned char   next_index;
    RGH_TEMPDATUM   data[RGH_NUM_SAMPLES];
} RGH_TEMPDATA;
#endif
const RGH_TEMPDATA * const rgh_zones_heat[RGH_NUM_ZONES] =
{
        (RGH_TEMPDATA *)&HEATDATAA,
        (RGH_TEMPDATA *)&HEATDATAB,
        (RGH_TEMPDATA *)&HEATDATAC,
        (RGH_TEMPDATA *)&HEATDATAD,
        (RGH_TEMPDATA *)&HEATDATAE,
        (RGH_TEMPDATA *)&HEATDATAF,
        (RGH_TEMPDATA *)&HEATDATAG,
        (RGH_TEMPDATA *)&HEATDATAH
};
const RGH_TEMPDATA * const rgh_zones_cool[RGH_NUM_ZONES] =
{
        (RGH_TEMPDATA *)&COOLDATAA,
        (RGH_TEMPDATA *)&COOLDATAB,
        (RGH_TEMPDATA *)&COOLDATAC,
        (RGH_TEMPDATA *)&COOLDATAD,
        (RGH_TEMPDATA *)&COOLDATAE,
        (RGH_TEMPDATA *)&COOLDATAF,
        (RGH_TEMPDATA *)&COOLDATAG,
        (RGH_TEMPDATA *)&COOLDATAH
};
```

What is claimed is:

1. A method of anticipating potential failure of a temperature modification device, comprising steps of:

repeatedly computing a value for a parameter representing the ability of a temperature modification device to change temperature in a predetermined zone;

determining if the ability of the temperature modification device to change temperature in the predetermined zone deteriorates over time, including comparing a current said value with a previous said value; and communicating a control signal for initiating inspection of the temperature modification device in response to a determined deterioration exceeding a predetermined tolerance;

wherein said step of repeatedly computing includes dividing a measured time for the temperature modification device to change temperature in the zone from a first temperature to a second temperature by the difference between the first and second temperatures.

2. A method of anticipating potential failure of a temperature modification device, comprising steps of:

repeatedly computing a value for a parameter representing the ability of a temperature modification device to change temperature in a predetermined zone;

determining if the ability of the temperature modification device to change temperature in the predetermined zone deteriorates over time, including comparing a current said value with a previous said value;

communicating a control signal for initiating inspection of the temperature modification device in response to a determined deterioration exceeding a predetermined tolerance; and storing, within a table defined in a memory of a digital computer, respective ones of said value which represent the best ability of the temperature modification device to change temperature in the zone at each of a plurality of temperature values which represent different ambient conditions outside the zone, wherein said stored values define the previous values used in said step of comparing.

3. A method of anticipating potential failure of a temperature modification device, comprising steps of:

(a) sensing at least one ambient condition that affects a rate at which a temperature modification device can change a temperature controlled by the temperature modification device;

(b) sensing the temperature controlled by the temperature modification device;

(c) determining, for a sensed at least one ambient condition, an actual rate at which the temperature modification device changes the sensed temperature from a first temperature to a second temperature;

(d) storing in a computer memory the determined actual rate and the corresponding sensed at least one ambient condition;

(e) repeating said steps (a), (b) and (c) after said step (d) and determining, for the same sensed at least one ambient condition, a current actual rate at which the temperature modification device changes the sensed temperature;

(f) comparing the current actual rate with the stored actual rate for the same at least one ambient condition to determine if the current actual rate indicates more efficient operation or less efficient operation of the temperature modification device;

(g) storing the current actual rate in place of the previously stored actual rate if said step (f) indicates more efficient operation of the temperature modification device; and (h) generating a control signal for initiating inspection of the temperature modification device if said step (f) indicates less efficient operation, by more than a predetermined tolerance, of the temperature modification device.

4. A method as defined in claim 3, wherein the sensed at least one ambient condition includes temperature outside a zone in which the temperature modification device controls temperature.

5. A method as defined in claim 3, wherein said step (c) includes dividing a measured time for the temperature modification device to change temperature from the first temperature to the second temperature by the difference between the first and second temperatures.

6. A method as defined in claim 3, wherein said step (g) includes maintaining in a computer a table of the actual rates representing the most efficient operation of the temperature modification device over a period of time, wherein the actual rates are stored in the table in conjunction with respective values representing outside temperatures existing when the actual rates were determined.

7. A method of anticipating potential failure within an HVAC system operated by a digital computer to heat or cool a zone, comprising steps of:

energizing an HVAC system to provide a selected one of heated air or cooled air to a zone, including:

storing in a digital computer a value, $T_{aim}$, for a desired temperature setpoint;

storing in the digital computer a value, $T_{start}$, of an actual temperature in the zone;

determining a difference between the stored desired temperature setpoint value and the stored actual temperature value and determining whether the difference indicates the need for the selected one of heated air or cooled air; and generating a control signal for energizing the HVAC system in response to the difference indicating the need for the selected one of heated air or cooled air so that heated air or cooled air is provided to the zone for changing the temperature in the zone from $T_{start}$ to $T_{aim}$;

determining whether the efficiency of the HVAC system changes over time, including performing the following steps contemporaneously at least once during each of a plurality of predetermined periods of time during which said step of energizing is repeatedly performed:

determining the amount of time, $\Delta t$, it takes for the energized HVAC system to change the actual temperature in the zone from the respective $T_{start}$ to the respective $T_{aim}$;

computing an efficiency value, $\Delta t/|T_{start}-T_{aim}|$, for the HVAC system;

sensing an ambient temperature outside the zone and storing a value, $T_{out}$, thereof in the digital computer; and comparing a present computed efficiency value with a prior computed efficiency value which was computed contemporaneously with sensing ambient temperature outside the zone at the same value of $T_{out}$ and which was stored in the digital computer in relation to a marker identifying said same value of $T_{out}$, wherein the present computed efficiency value exceeding the prior computed efficiency value represents a decrease in efficiency of the HVAC system and wherein the prior computed efficiency value exceeding the present computed efficiency value represents an increase in efficiency of the HVAC system;

storing the present computed efficiency value in the digital computer in place of the prior computed efficiency value for the same value of $T_{out}$ in response to said step of comparing indicating an increase in efficiency; and generating and transmitting from the digital computer a control signal for initiating inspection of the HVAC system in response to said step of comparing indicating a decrease in efficiency exceeding a predetermined tolerance.

* * * * *

UNITED STATES PATENT AND TRADEMARK OFFICE
CERTIFICATE OF CORRECTION

PATENT NO. : 5,729,474
DATED : March 17, 1998
INVENTOR(S) : Paul N. Hildebrand, et al It is certified that error appears in the above-identified patent and that said Letters Patent is hereby corrected as shown below:

Column 6, line 42, change "=" to -- - --.

Line 7 of the computer program listing on the patent page containing columns 9 and 10, change "naty" to --nasty--.

Line 27 of the computer program listing on the patent page containing columns 9 and 10, change the second occurrence of "*" to --&--.

Line 34 of the computer program listing on the patent page containing columns 9 and 10, change "run__time" to --outside--.

Line 56 of the computer program listing on the patent page containing columns 9 and 10, change "Elpased" to --Elapsed--.

UNITED STATES PATENT AND TRADEMARK OFFICE
CERTIFICATE OF CORRECTION

PATENT NO. : 5,729,474
DATED : March 17, 1998
INVENTOR(S) : Paul N. Hildebrand, et al It is certified that error appears in the above-identified patent and that said Letters Patent is hereby corrected as shown below:

Line 64 of the computer program listing on the patent page containing columns 9 and 10, change both occurrences of "infor" to --info--.

Column 11, line 56, delete the subparagraph indentation so that lines 53-57 are one continuous subparagraph (patent claim 1).

Signed and Sealed this

Second Day of February, 1999

Attest:

Attesting Officer

*Acting Commissioner of Patents and Trademarks*